(12) United States Patent
Yoshimori et al.

(10) Patent No.: US 7,234,847 B2
(45) Date of Patent: Jun. 26, 2007

(54) PROJECTOR

(75) Inventors: Norihito Yoshimori, Tokyo (JP); Masayuki Taguchi, Tokyo (JP)

(73) Assignee: Light Boy Co., Ltd. (JP)

( * ) Notice: Subject to any disclaimer, the term of this patent is extended or adjusted under 35 U.S.C. 154(b) by 75 days.

(21) Appl. No.: 10/555,797

(22) PCT Filed: Jan. 14, 2005

(86) PCT No.: PCT/JP2005/000382

§ 371 (c)(1),
(2), (4) Date: Nov. 7, 2005

(87) PCT Pub. No.: WO2005/068901

PCT Pub. Date: Jul. 28, 2005

(65) Prior Publication Data

US 2007/0014116 A1    Jan. 18, 2007

(30) Foreign Application Priority Data

Jan. 15, 2004    (JP) .............................. 2004-008494

(51) Int. Cl.
*F21V 21/36* (2006.01)
(52) U.S. Cl. .................. 362/403; 362/285; 362/418
(58) Field of Classification Search ................ 362/285, 362/418–419, 427–428, 288, 403
See application file for complete search history.

(56) References Cited

U.S. PATENT DOCUMENTS 3,586,270 A * 6/1971 Loffler et al. ................ 362/486
6,276,811 B1 * 8/2001 Yoshimori et al. .......... 362/192
6,299,336 B1 * 10/2001 Hulse ......................... 362/526

FOREIGN PATENT DOCUMENTS

| JP | 57-80112 | 5/1982 |
|---|---|---|
| JP | 58-13122 | 1/1983 |
| JP | 2-197008 | 8/1990 |
| JP | 6-37033 U | 5/1994 |
| JP | 6-50682 U | 7/1994 |
| JP | 7-331926 A | 12/1995 |
| JP | 10-172337 A | 6/1998 |
| JP | 2002-25330 A | 1/2002 |
| JP | 2003-036709 | 2/2003 |
| JP | 3096916 U | 1/2004 |

* cited by examiner

*Primary Examiner*—Thomas M. Sember
*Assistant Examiner*—Julie A. Shallenberger
(74) *Attorney, Agent, or Firm*—Akerman Senterfitt

(57) ABSTRACT

A projector (1) enabling the extension/retraction of a column even when the column is rotated, including the telescopic column (4) installed on a carrier (6) as a base, a lifting and lowering device (21) installed in the column (4), a lighting apparatus (2) installed at the tip of the column (4), and a power supply (5) for supplying power to the lighting system (2). The column (4) is formed of circular tubes and rotated in conjunction with the lifting and lowering device (21). Also, the column (4) is formed by loosely fitting, to each other, a first column (13) fixed to the carrier (6) and second and third columns (4a) and (4b) having outer diameters reduced in that order less than that of the first column (13). The second and third columns (4a) and (4b) are loosely fitted to each other so as to be moved in the vertical direction and rotated in conjunction with each other.

23 Claims, 32 Drawing Sheets

(a)

(b)

(a)　　　　　　　　　　(b)

PROJECTOR

TECHNICAL FIELD

The present invention relates to a projector serving as a lighting system used in the open air at the time of road construction or the like. Particularly, the present invention pertains to a mechanism of a telescopic support column installed in a standing posture on a carrier.

Heretofore, as a night lighting for the road construction of this sort and sports facilities, a projector equipped with the lighting system mounted on a distal end of the support column and an electric power unit for powering the lighting system have been employed. In such a projector, in order to make signs or indicators easily visible and widen the range of lighting, a telescopic, i.e., extendable/retractable support column mechanism is employed in which the support column is arbitrarily extended according to need.

Such telescopic support column mechanism is disclosed in Japanese registered patent publication No. 3197834. That is, in the telescopic support column mechanism, when the support column is extended or retracted, for the sake of reducing the burden on an operator, second and third support columns whose inner diameters are made generally smaller in that order are loosely and vertically slidably fitted in sequence into a first support column fixed to an upper surface of a carrier. On the other hand, inside an intermediate column at a lower stage, a gas damper loosely fitted into an inside of an auxiliary tube is installed vertically movably with its rod extending and retracting portion being faced downward. A distal end of the gas damper rod is fixed to an inner bottom of a base support column and further a pulley is provided on an upper portion of the gas damper. Then, a wire whose one end is fixed to the underneath of the support column and whose other end is fixed to the underneath of the third support column is wound around the pulley.

DISCLOSURE OF THE INVENTION

Problems to be Solved by the Invention

According to the projector disclosed in the patent document described above, however, when the support column is made up of a circular tube, there is a likelihood that by the rotating motion of each support column, wires included in the support column are twisted, so that telescopic motion of the support columns becomes difficult. In the worst case, the wires are likely to be disengaged from the pulley, thus making the support column inextendable.

On the other hand, if the support column is made up of a circular tube, it will benefit an operator because it can prevent him/her from being injured by edges of the support column to thereby improve convenience in using the same, and thus it is desirable.

Consequently, in view of the problems of the conventional art described above, it is an object of the present invention to provide a projector capable of extending and retracting the support columns even if the support columns have been turned.

Means for Solving the Problems

For the attainment of the object described above, there is provided a projector equipped with a telescopic support column installed on a base, a lifting and lowering device included inside the support column, a lighting system provided at a distal end of the support column, and an electric power unit for powering the lighting system. In the projector, the support column is made of circular tubes, which turns in conjunction with the lifting and lowering device.

Further, the support column is constituted by loosely fitting a base support column fixed to a base and an upper support column comprising a plurality of the support columns whose outer diameters are made smaller in ascending order relative to the base support column. Further, a plurality of the support columns constituting the upper support column may be loosely fitted into one another in a vertically movable manner and besides in a rotatable manner in conjunction with one another.

Furthermore, the upper support column comprises second and third support columns. The lifting and lowering device is loosely fitted into an inside of the second support column in a vertically movable manner and is equipped with a biasing means that biases the support column in its extending direction. A lower end of the biasing means is fixed to the inner bottom of the first support column, while an upper end thereof is provided with a first pulley. A first wire whose one end is fixed to a receiving portion that turns in conjunction with the support column and the other end to the underneath of the third support column, may be wound around the first pulley.

Alternatively, the upper support column may comprise a second, third, and fourth support columns. Inside the third support column, there is provided an internal support column that is loosely fitted into the fourth support column in a vertically movable manner relative to the fourth support column. The lifting and lowering device is loosely fitted into the second support column in a vertically movable manner relative to the second support column and is equipped with a biasing means that biases the second support column in its extending direction. A lower end of the biasing means is fixed to the inner bottom of the base support column and an upper end thereof is provided with a first pulley. A first wire whose one end is fixed to a receiving portion that turns in conjunction with the upper support column and the other end to the underneath of the third support column, is wound around a first pulley. Further, a second pulley is provided on an upper portion of the internal support column and a second wire whose one end is fixed to the underneath of the second support column and the other end to the underneath of the fourth support column, may be wound around the second pulley.

Moreover, there may be provided through-holes for making the wire communicate with the bottom surfaces of the second and third support columns.

Besides, there may be provided an outrigger device equipped with a protruding rod extending radially from the base, a spindle for rotatably supporting the protruding rod from a protruded position where the protruding rod is radially extended out toward a vertically upward direction of the base, and a lock mechanism for locking the protruding rod to its protruded position.

The spindle may be composed of a bolt and a nut, and a bolt fixing member. When the protruding rod turns from the protruded position to a base side, the spindle tightens the proximal end of the protruding rod to hold vertically the protruding rod.

Further, there may be provided a drop preventing mechanism comprising a movable pulley supported in a manner slightly vertically movable and lockable together with a rotating shaft, a locking claw rotating in conjunction with vertical motion of the movable pulley, and an engaging portion that the engaging claw engages with and is provided on a peripheral wall of the upper support column.

Moreover, the lighting system may be equipped with a balloon, an electric bulb, a holding frame for holding the electric bulb, a balloon-inflating means for inflating the balloon. Further, in a periphery of the balloon, the lighting system may be mounted with a foldable storage bag for storing a contracted balloon, and an openable and closeable storage body for storing the storage bag.

Further, the storage bag and the storage body may be mounted on a central portion of an upper surface of the balloon.

Furthermore, the holding frame may comprise an upper plate fixed to the central portion of the upper surface of the balloon, a lower plate fixed to the central portion of the lower surface of the balloon, and a plurality of the support column erected between the upper plate and the lower plate. The support columns may be telescopic.

Moreover, the balloon may comprise an upper portion, an intermediate portion and a lower portion so that the upper portion, the lower portion and the intermediate portion may be joined detachably by a engageable and disengageable means.

Furthermore, an arbitrarily colored color filter may be attached detachably to a periphery of the holding frame.

Besides, on an upper end of the support column, an angle adjustment unit may be mounted, which comprises a first spindle for supporting the lighting system in a manner capable of rotating back and forth and a biasing member for biasing rotating motion of the lighting system.

Further, the angle adjustment unit may be equipped with a second spindle for supporting the lighting system in a manner capable of rotating in a horizontal direction.

EFFECTS OF THE INVENTION

According to a projector of a first aspect of the present invention, the support column comprising the circular tubes turns in conjunction with the lifting and lowering device. Hence, the support column can be extended and retracted regardless of a rotating position of the support column.

According to the projector of a second aspect of the present invention, the second and third support columns are loosely fitted into the first support column fixed to the base in a vertically movable manner and in a rotatable manner relative to the first support column. Hence, even in cases where the second and third support columns turn arbitrarily, the height of the support column can be easily adjusted.

According to the projector of a third aspect of the present invention, a lifting and lowering device can extend and retract the support column by using the biasing means biased in an extending direction of the support column. Hence, the burden on an operator can be reduced and fast extending and retracting operation is possible.

According to the projector of a fourth aspect of the present invention, even if the support column comprises four stages, the support column can be extended and retracted regardless of the rotating position of the support column.

According to the projector of a fifth aspect of the present invention, the wires are not exposed to the outside by winding the wires inside the support column. Hence, there is no possibility that the operator may touch the wires and thus be injured. Further, the appearance of the projector can be improved.

According to the projector of a sixth aspect of the present invention, when each of the protruding rods radially protrudes outward from the carrier, load of a weight member is applied to the engaging pin, so that the rotation of the protruding rod in a housing direction thereof is restricted to automatically lock a protruded state of each protruding rod. In addition, the protruding state in each protruding rod is separately regulated within a region from an upper limit to a lower limit of the protruded position and thus the carrier is allowed to level, thus allowing the carrier to be fixed to an installation surface with excellent stability and reliability. On the other hand, if each protruding rod is turned toward a carrier direction, each protruding rod is held in a vertically housed state. Accordingly, maneuverability of the projector before and after its use can be substantially improved in addition to the provision of a carrier fixing function with the equivalent stability to that of the conventional device, so that a ready-to-assemble and inexpensive outrigger device can be provided.

According to the projector of a seventh aspect of the present invention, a bolt head of the spindle is fixed by the bolt fixing member. Hence, a nut turns clockwise together with the protruding rod and then tightening strength of the spindle increases to be able to hold the protruding rod in a vertical posture, thus allowing the protruding rod to be prevented from falling to extend out in a horizontal direction at the time of carrying the projector.

According to the projector of an eighth aspect of the present invention, a movable pulley is reliably locked at a lifted position together with its rotating shaft, against a spring biasing force as long as a tensile force is acting on a wire rope. In this state, the locking claw is in a retreated position inside the circular tube, so that it has no influence on the lifting and lowering of the circular tube. If the tensile force of the wire rope is lost due to being cutoff or the like, the protruding of the locking claw is ensured by the spring biasing force to thereby engage with the engaging portion, thus preventing the circular tube from dropping. Furthermore, even if, in this state, the dropping of the circular tube is accelerated from any cause and thus a certain force acts to withdraw the engaging claw, yet a fixed shaft for supporting the locking claw and the rotating shaft loosely fitted into a guide hole of the locking claw function as a stopper, so that an engaging state between the locking claw and the engaging portion can be reliably maintained while making the spring biasing force strong enough for the engaging claw to be withdrawn or retreated by the tensile force of the wire rope. Consequently, should the wire rope be cutout, impact shocks applied to any equipment installed on the upper end of the circular tube, e.g., a lighting lamp, a speaker or the like would be little. Therefore, these equipments can be prevented from being damaged, enhancing the effectiveness of the conventional drop preventing mechanism for ensuring safety of workers, passengers or the like present in the neighborhood thereof, thus improving the reliability of the projector product itself. It should be also noted that efficient work with the projector is possible without affecting the normal action of the telescopic support column.

The projector of a ninth aspect of the present invention is advantageous in various respects, such that only a simple work of just covering the contracted balloon with the storage bag enables a user to convey or store the contracted balloon with the balloon being kept contracted. Further, when the balloon is inflated, the storage bag is folded up and stored in the storage body. As a result, the storage bag is always furnished on the balloon. Thus, there would be no concern about the loss of the storage bag.

According to the projector of a tenth aspect of the present invention, a storage bag and a storage body are mounted on the central portion of the upper surface of the balloon. Hence, when using the balloon (when lighting), there is no likelihood that the storage bag and the storage body will block illuminating light and besides workability is improved when covering the contracted balloon with the storage bag.

According to the projector of an eleventh aspect of the present invention, a height of the holding frame can be adjusted in accordance with a shape and size of the balloon and besides a height of an electric bulb can be arbitrarily adjusted. Hence, various types of the balloons with different shapes and sizes can be arbitrarily selected and can be replaced or mounted.

According to the projector of a twelfth aspect of the present invention, the balloon is divided into three portions: the upper portion, the intermediate portion and the lower portion, and these three portions are connected detachably from each other by the engageable and disengageable means. Hence, when the intermediate portion is damaged after long-term use, replacing work thereof can be easily performed.

According to the projector of a thirteenth aspect of the present invention, the color filter can be detachably mounted on the periphery of the holding frame. Hence, an arbitrary color filter can be selected from among a plurality of the color filters prepared to be mounted on the balloon, so that a balloon type lighting system capable of irradiating light of an arbitrary color can be obtained.

According to the projector of a fourteenth aspect of the present invention, if the lighting system is a heavy load, yet a buffer action operates against backward and forward rotating motion by the anterior and posterior biasing members, thus preventing the lighting system from abruptly rotating due to weight of the lighting system, so that safety working is possible.

According to thee projector of a fifteenth aspect of the present invention, by supporting a tubular member in a horizontally rotatable manner, the lighting system can freely turn horizontally, thus allowing an illuminating angle and an illuminating range or the like to be adjusted more widely.

BRIEF DESCRIPTION OF DRAWINGS

The invention will be more readily understood by reference to the following description, taken with the accompanying drawings, in which:

FIG. 32(*b*) is a partially cutaway view illustrating a backward and forward rotating state of the angle adjustment unit and especially illustrating a nearly horizontally laid down state in FIG. 29.

BEST MODE FOR CARRYING OUT THE INVENTION

Hereunder is a description of preferred embodiments of the present invention with reference to the accompanying drawings.

Embodiment 1

Figure 1:
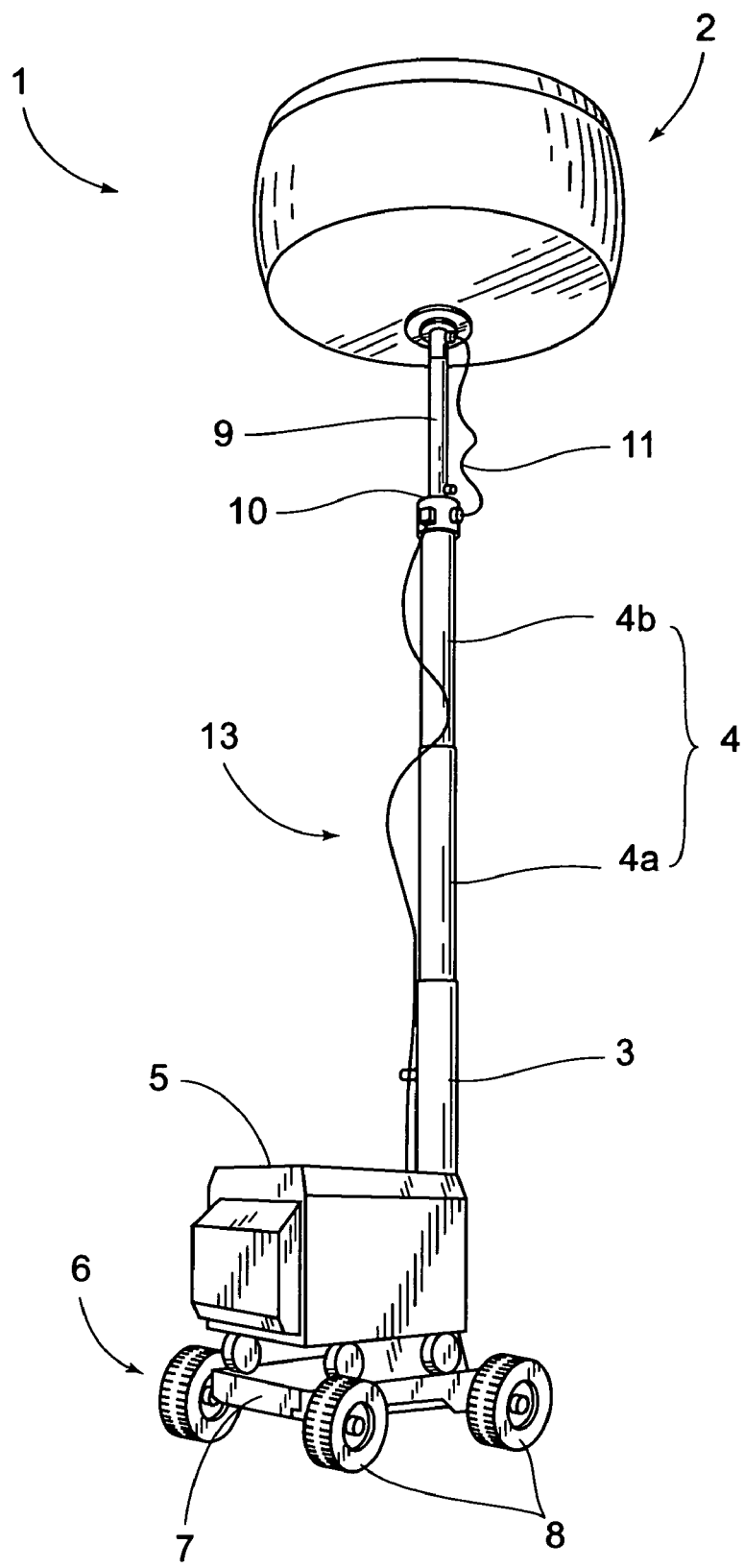
FIG. 1 is an overall structural view illustrating schematically an outline of a projector of the present invention.

First, a description is given for an outline of an overall structure of a projector according to a first embodiment of the present invention with reference to FIG. 1. FIG. 1 is a schematic diagram showing an overall structure of a projector of the present invention.

The projector 1 comprises a telescopic support column 13 installed on a carrier 6 serving as a base, a lifting and lowering device 21 provided inside the support column 13, a lighting system 2 provided at a distal end of the support column 13, and a power supply unit 5 for energizing the lighting system 2. Here, the base is exemplified as the carrier 6 equipped with axels for facilitating the movement of the power supply unit 5, but is not limited to the example. For example, a support leg for holding the support column 13 in a standing posture may be used. For the power supply unit 5, it goes without saying that a generator, a battery or a home power supply may be employed.

In the carrier 6, wheels 8 are mounted at back and front, left and right sides of a vehicle body 7 in an axially rotatable manner and the power supply unit 5 with wheels can be disengageably mounted thereto. In the meantime, the power supply unit 5 may be without wheels, and/or may be mounted on the carrier 6 in a detachable or fixed manner.

The lighting system 2 comprises a balloon, an electric bulb provided in the balloon (not shown), and a fan for supplying air to inflate the balloon. In the meantime, it goes without saying that the lighting system 2 is not limited to this example and accordingly a lighting system with a light source without balloon, e.g., a lighting system with a required number of lighting lamps may be used.

The lighting system 2 is, in a freely detachable manner, coupled to an upper end of the support column 13 through a connecting support column 9. An upper end of the connecting support column 9 is coupled to the central portion of a lower end of the lighting system 2, while a lower end of the connecting support column 9 is, in a freely detachable manner, coupled to an upper end of the support column 13 through a coupling member 10. As a result, the lighting system 2 can be installed in the support column 13 in a freely detachable manner.

The coupling member 10 is equipped with a plug outlet (not shown) which a connector of a cable 11 for supplying power to the lighting system 2 is plugged into. The connector is connected with the power supply unit (generator) 5 via the cable 11 and electric power fed from the generator 5 is fed to the electric bulb and the fan that are included in the lighting system 2.

Figure 2:
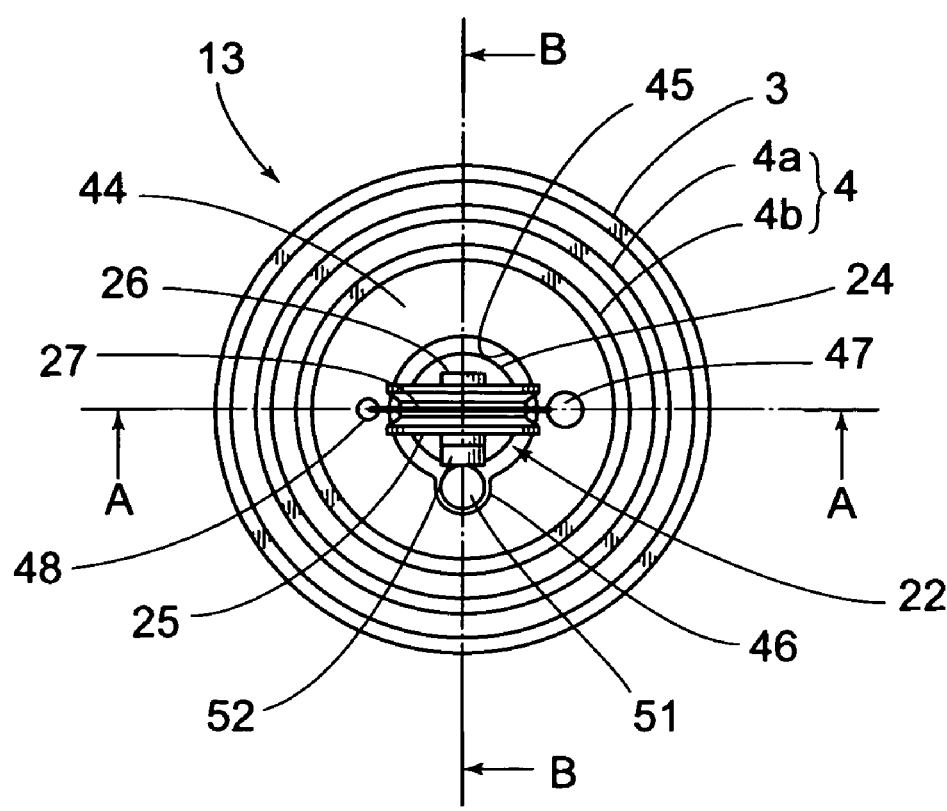
FIG. 2 is a plain view illustrating schematically a support column structure of the present embodiment of the present invention.
Figure 3:
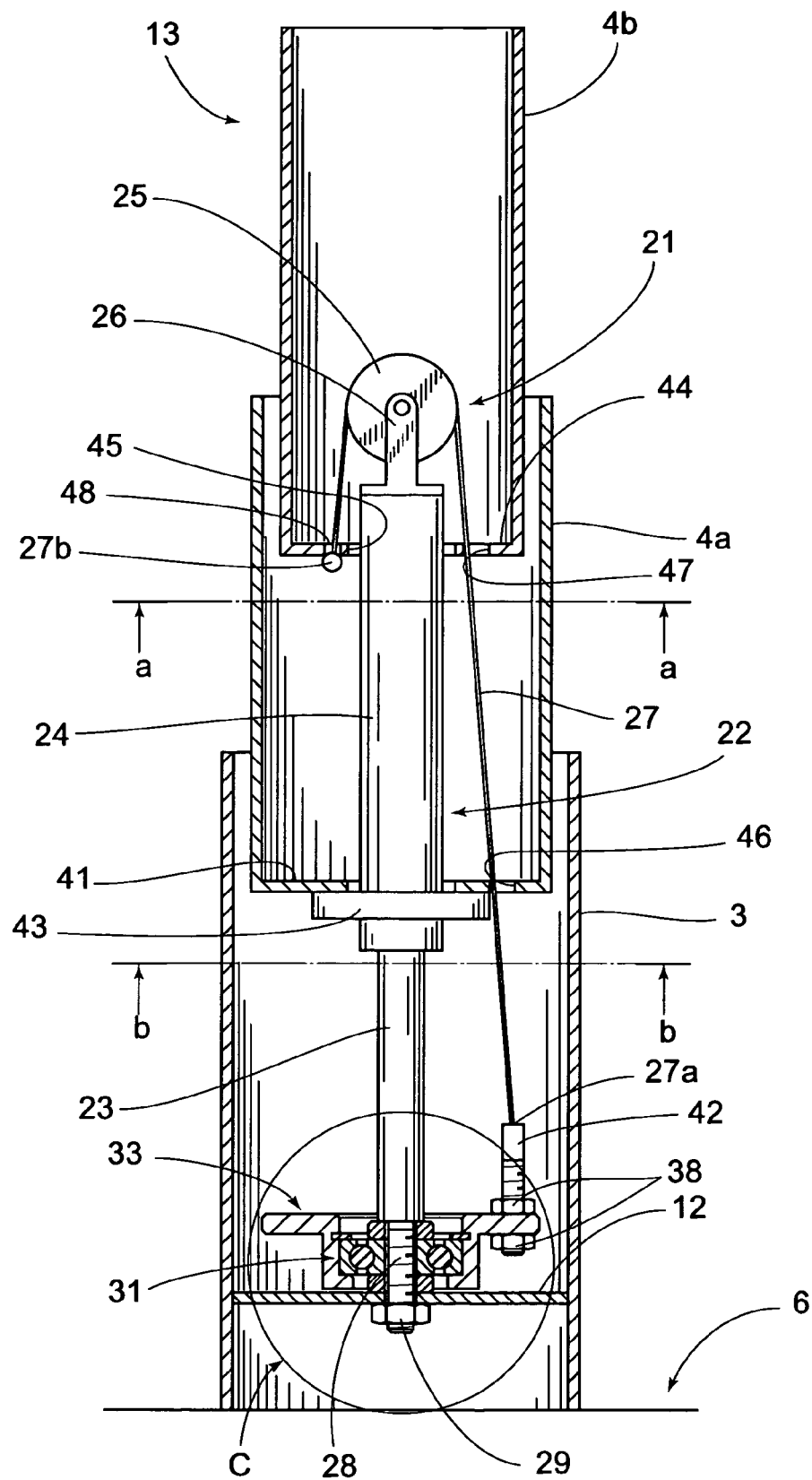
FIG. 3 is a cross-sectional view taken on line A-A in FIG. 2.
Figure 4:
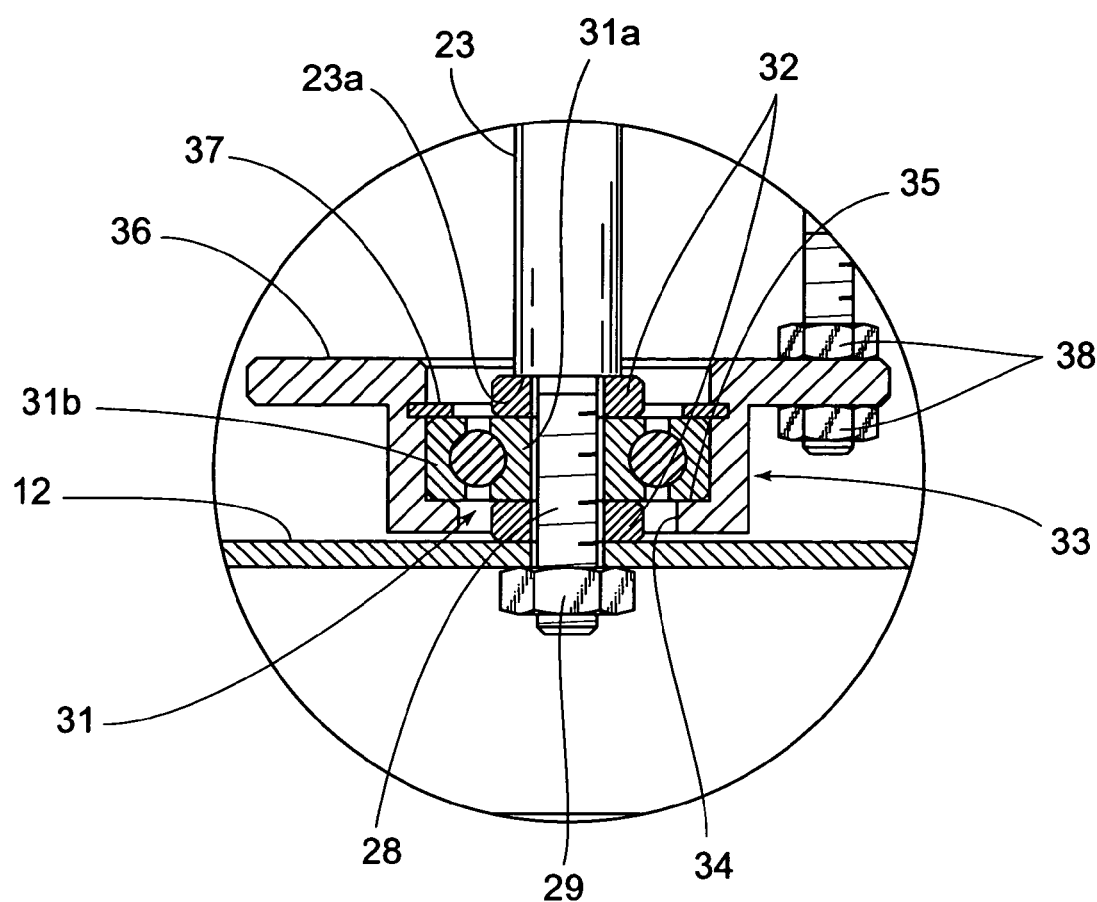
FIG. 4 is a partially enlarged view of a portion C in FIG. 3.
Figure 5:
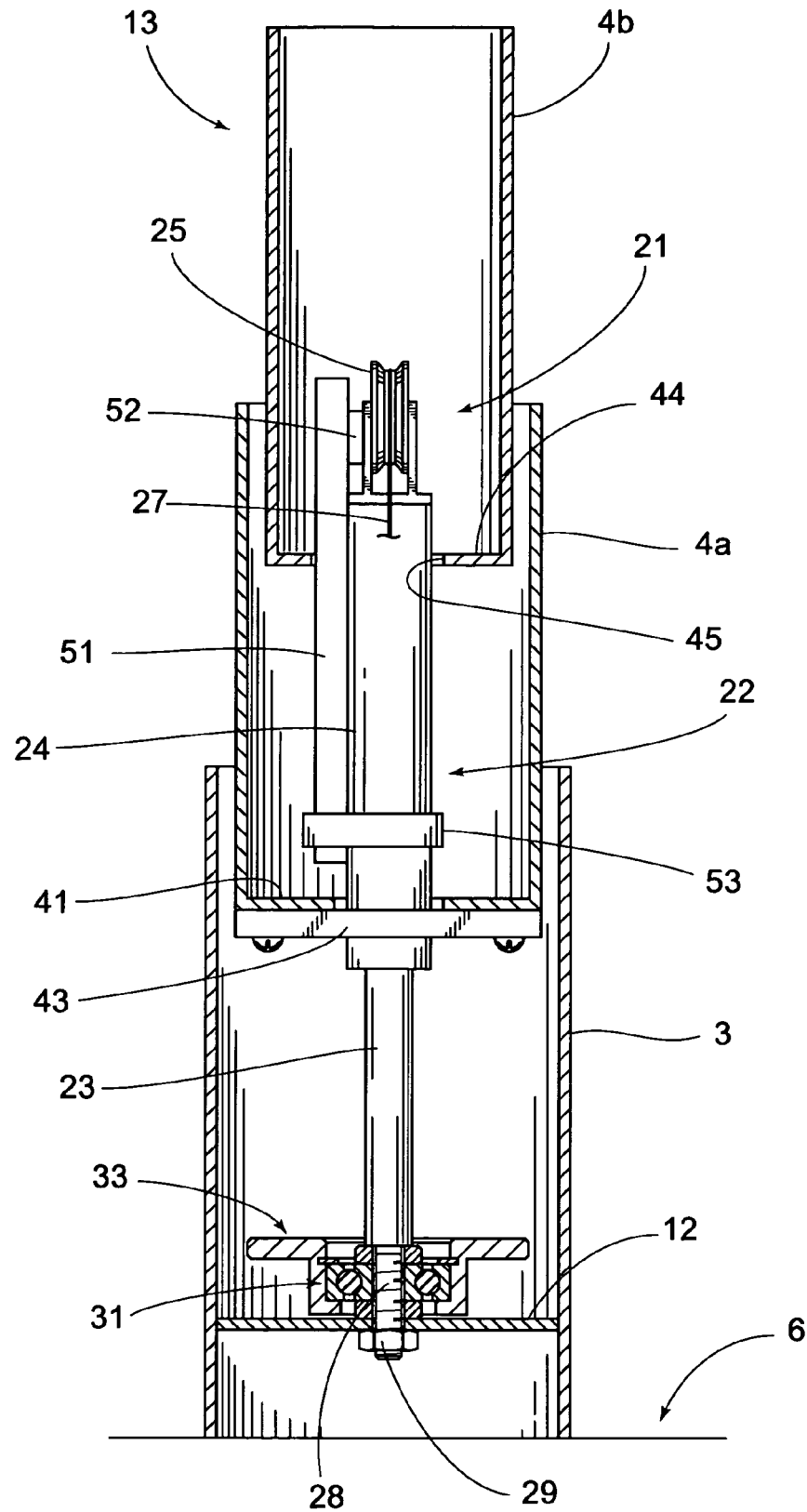
FIG. 5 is a cross-sectional view taken on line B-B in FIG. 2.
Figure 6:
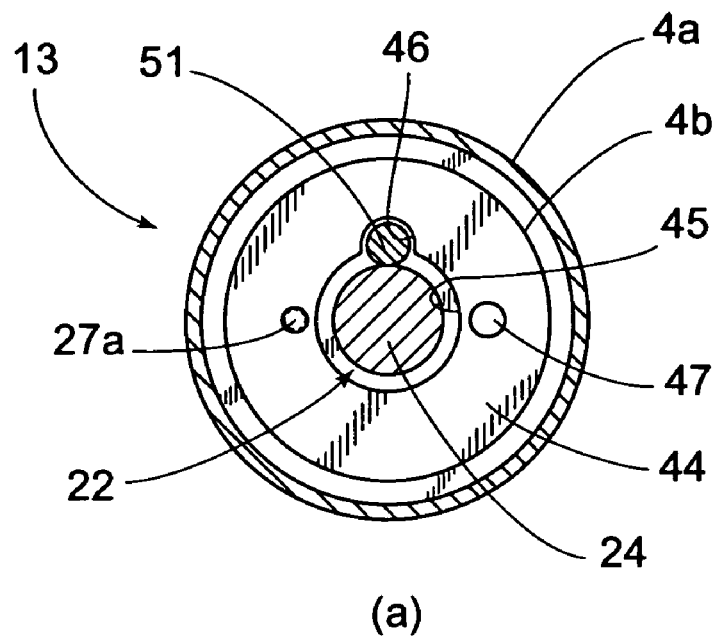
FIG. 6(a) is a traverse sectional view illustrating the support column structure of the present embodiment and a cross-sectional view taken on line a-a in FIG. 3.
FIG. 6(b) is a traverse sectional view illustrating the support column structure of the present embodiment and cross-sectional view taken on line b-b in FIG. 3.
Figure 6:
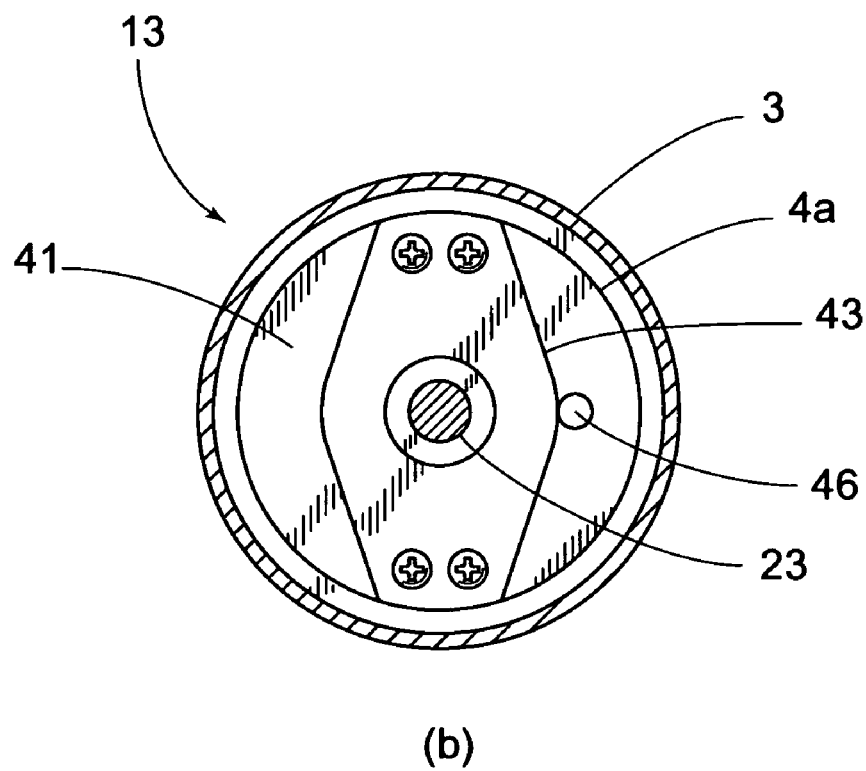

Next is a description of a structure of the telescopic support column 13 according to the preferred embodiment of the present invention with reference to FIGS. 2 to 6. FIG. 2 is a schematic plan view showing a support column structure according to the present embodiment. FIG. 3 is a cross-sectional view taken on line A-A in FIG. 2. FIG. 4 is a partially enlarged view of a portion C in FIG. 3. FIG. 5 is a cross-sectional view taken on line B-B in FIG. 2. FIG. 6 is a traverse sectional view showing the support column structure of the present embodiment, in which (a) is a cross-sectional view taken on line a-a in FIG. 3 while (b) is one on line b-b in FIG. 3.

The support column 13 comprises a plurality of circular tubes and is constituted by loosely fitting a first support column 3 and second, third support columns 4*a*, 4*b* to each other. The first support column 3 acts as a base support column and is fixed to the carrier 6. The second, third support columns 4*a*, 4*b* are made smaller in outer diameter in ascending order relative to the first support column 3 and make up an upper support column 4. The first, second, third support columns 3, 4*a* and 4*b* are loosely fitted into each other in a vertically movable manner and in a rotatable manner in conjunction with each other such that they can rotate in conjunction with the lifting and lowering device 21 installed inside the support column 13. The lifting and lowering device 21 is equipped with a gas damper 22 that is loosely fitted inside the second support column 4*a* and acts as a biasing means for biasing the upper support column 4 toward its extending direction. A lower end of the gas damper 22 is fixed to the inner bottom 12 of the first support column 3. A first pulley 25 is provided on an upper end of the gas damper 22. Around the first pulley 25 is wound a first wire 27 having one end 27*a* fixed to a receiving portion 33 rotating in conjunction with the upper support column 4 and an other end 27*b* fixed to the underneath of the third support column 4*b*.

The lower end of the first support column 3 is fixed to the carrier 6 by a fixing means such as welding and is held in nearly vertically standing posture, while a lower end of the gas damper 22 is fixed to the inner bottom 12 of the first support column 3. The second support column 4*a*, the third support column 4*b* and the lifting and lowering device 21 are provided above the inner bottom 12.

The gas damper 22 is installed in a standing posture with an extending/retracting side of a rod 23 being faced downward. Male thread 28 is formed on a lower end of the rod 23 so that the gas damper 22 is fixed to the inner bottom 12 by inserting the lower end of the rod 23 into the inner bottom 12 and screwing a nut 29 thereinto from the beneath of the inner bottom 12. A bearing 31 provided on the upper side of the inner bottom 12 is supported by sandwiching an inner race 31*a* thereof between the inner bottom 12 and a shoulder portion 23*a* of the rod 23 via two rings 32 provided above and below the inner race 31*a*. Consequently, the rod 23 and the inner race 31*a* of the bearing 31 are fixed integrally with the first support column 3 and the carrier 6.

On the other hand, an outer race 31*b* of the bearing 31 is inserted into an inner circumference of the receiving portion 33. The receiving portion 33 comprises: a depressed portion 35 composed of a bottom with a through-hole 34 having a larger diameter than the inner race 31*a* and a cylindrical portion having an inner diameter nearly the same as an outer diameter of the outer race 31b; and a flange 36 extending from the depressed portion 35. The outer race 31b inserted into the depressed portion 35 is sandwiched between a locking portion 37, e.g., a C ring and the depressed portion 35 of the receiving portion 33. Thus, the receiving portion 33 is rotatably supported relative to the rod 23.

A through-hole is provided in the flange 36 formed in the receiving portion 33. A distal end of one end 27a of the first wire 27 is coupled to a junction 42 by caulking and then the junction 42 is screwed into the lock nut 38 to be fixed to the flange 26, thereby being coupled to the receiving portion 33. Thus, the one end 27a of the first wire 27 is rotatably supported to the rod 23 and the first support column 3.

The second, third support columns 4a, 4b constituting the upper support column 4 have outer diameters decreased in ascending order relative to the first support column 3, and the upper support column 4 is loosely fitted into the first support column 3 in a vertically movable and rotatable manner. The second support column 4a is composed of a circular tube with a bottom. An end of the extending/retracting side of the rod 23 in the main body 24 is supported fixedly to the bottom surface 41 of the second support column 4a by a detachable means 43. Thus, the main body 24 of the gas damper 22 is fixed integrally with the second support column 4a and is, with the gas damper 22 being vertically provided inside the second support column 4a, supported rotatably relative to the first support column 3, independently of the rod 23. Likewise, also the third support column 4b is composed of a circular tube with a bottom and the bottom surface 44 has a through hole 45 through which the main body 24 of the gas damper 22 can move and further the other end 27b of the first wire 27 is fixed to the bottom surface 44.

A first pulley 25 is arranged in a rotatable manner by means of a supporting portion 26 on the upper end of the main body 24 of the gas damper 22. A first wire 27, whose one end 27a is connected to the flange 36 of the receiving portion 33 and whose other end penetrates through-holes 46, 47 formed at the bottom surface 41, 44 of the second and third support columns 4a, 4b and is locked to the bottom surface 44 of the third support column 4b, is wound around the first pulley 25. The other end 27b of the first wire 27 is provided with a locking portion and is locked through a hole 48 formed at an axial symmetric position to the through hole 47.

As shown in FIG. 5, a first longitudinal lever 51 is annexed to a side face of the main body 24 and an upper end of the first longitudinal lever 51 is fixed to the supporting portion 26 of the first pulley 25 via a spacer 52, while the lower end thereof is fixed to the main body 24 by means of a gripping member 53 on an upper side of the bottom surface 41 of the second support column 4a. Thus, the first longitudinal lever 51 is fixed integrally with the main body 24 to turn together with the main body 24. As shown in FIGS. 6(a), 6(b), the bottom surface 44 of the third support column 4b includes a cutout portion 46 made by forming part of a through hole 45 into an approximate size of the first longitudinal lever 51, which penetrates the cutout portion 46. As a result, the third support column 4b can turn in conjunction with the main body 24 via the first longitudinal lever 51 and further, as described above, the main body 24 and the second support column 4a are integrally fixed. Hence, the second support column 4a, the third support column 4b, and the main body 24 is supported in a rotatable manner in conjunction with the first support column 3.

According to the structure described above, one end 27a of the first wire 27 coupled to the flange 33 can arbitrarily change its position by following rotating motion of the first pulley 25, i.e., the rotating motion of the second support column 4a, the third support column 4b and the main body 24. Hence, even if the second support column 4a and the third support column 4b turn, the first wire 27 can be prevented from disengaging from the first pulley 25, thus allowing the support column 13 to perform telescopic motion.

Next is a description of behavior of the support column 13 structure according to the present embodiment.

First, a description is given with regard to behavior in adjustment of the height of the support column 13. When extending the support column 13, an operator pushes up a gripper, not shown, provided in a periphery of the second support column 4a to apply force upward to the second support column 4a, and thus the main body 24 rises along with the rod 23 being extended by the gas damper 22 operating secondarily. As a result, the main body 24 rises and the main body 24 of the gas damper 22. Then, the main body 24 of the gas damper 22 and the bottom surface 41 of the second support column 4a are supported fixedly by a detachable means to be integrally fixed together, so that the second support column 4a rises. Further, along with rise of the first pulley 25, the third support column 4b rises integrally with the first pulley 25, so that the support column 13 can be extended.

When retracting the support column 13, the operator pushes down the gripper to apply force downward to the second support column 4a and thus the main body 24 lowers along with the retracting of the rod 23, so that the second support column 4a lowers together with the main body 24. Further, the first pulley 25 lowers and hence the third support column 4b lowers together with the first pulley 25, thus allowing the support column 13 to be retracted.

Further, a description is given for the cases where the second, third support columns 4a, 4b turn relatively to the first support column 3 with the axial direction of the support column 3 defined as the rotating center. As described above, the third support column 4b can turn in conjunction with the second support column 4a through the intermediary of the first longitudinal lever 51 and further the main body 24 and the second support column 4a are fixed integrally as referred to above. Hence, when the second and third support columns 4a, 4b turn in conjunction with each other, thus the main body 24 turns, so that the first pulley 25 installed on the upper end of the main body 24 turns integrally with the third support column 4b. Consequently, since the other end 27b of the first wire 27 wound around the first pulley 25 is locked to the bottom surface 44 of the third support column 4b, positional relationship between the other end 27b of the first wire 27 and the first pulley 25 remains entirely unchanged before and after the rotating motion.

On the other hand, the one end 27a of the first wire 27 penetrates through-holes 46, 47 formed in the bottom surfaces 41, 44 of the second and third support columns 4a, 4b, respectively. A distal end of the one end 27a is connected to the junction 42 by caulking or the like and besides the junction 42 is screwed into a lock nut 38 to be fixed to the flange 36 of the receiving portion 33 supported to the outer race 31b of the bearing 31 and thus is connected to the receiving portion 33. It goes without saying that a length and degree of tension of the first wire 27 wound can be adjusted by means of the lock nut 38.

The receiving portion 33 comprises a bottom provided with a through hole 34 larger than the diameter of the inner race 31a, a depressed portion 35 having a cylindrical shape whose inner diameter is nearly the same as a outer diameter of the outer race 31b, and a flange 36 formed continuously with the depressed portion 35. An upper portion and lower portion of the outer race 31b of the receiving portion 33 inserted into the depressed portion 35 are supported in a sandwiched manner by means of a stopper 37, e.g., a C ring and by means of the depressed portion 35 of the receiving portion 33, respectively, so that the receiving portion 33 is supported to the rod 23 in a rotatable manner. Consequently, the one end 27a of the first wire 27 connected to the flange 33 can change arbitrarily its position following the rotating motion of the first pulley 25, i.e., the second and third support columns 4a, 4b and the main body 24. Hence, before the first wire 27 suffers stress to disengage from the first pulley 25, the one end 27b of the first wire 27 can be moved to an appropriate position in a rotating direction, so that the first wire 27 can be prevented from disengaging from the first pulley 25, thus allowing the support column 13 to be extended or retracted regardless of the rotating motion of the second and third support columns 4a, 4b.

Figure 7:
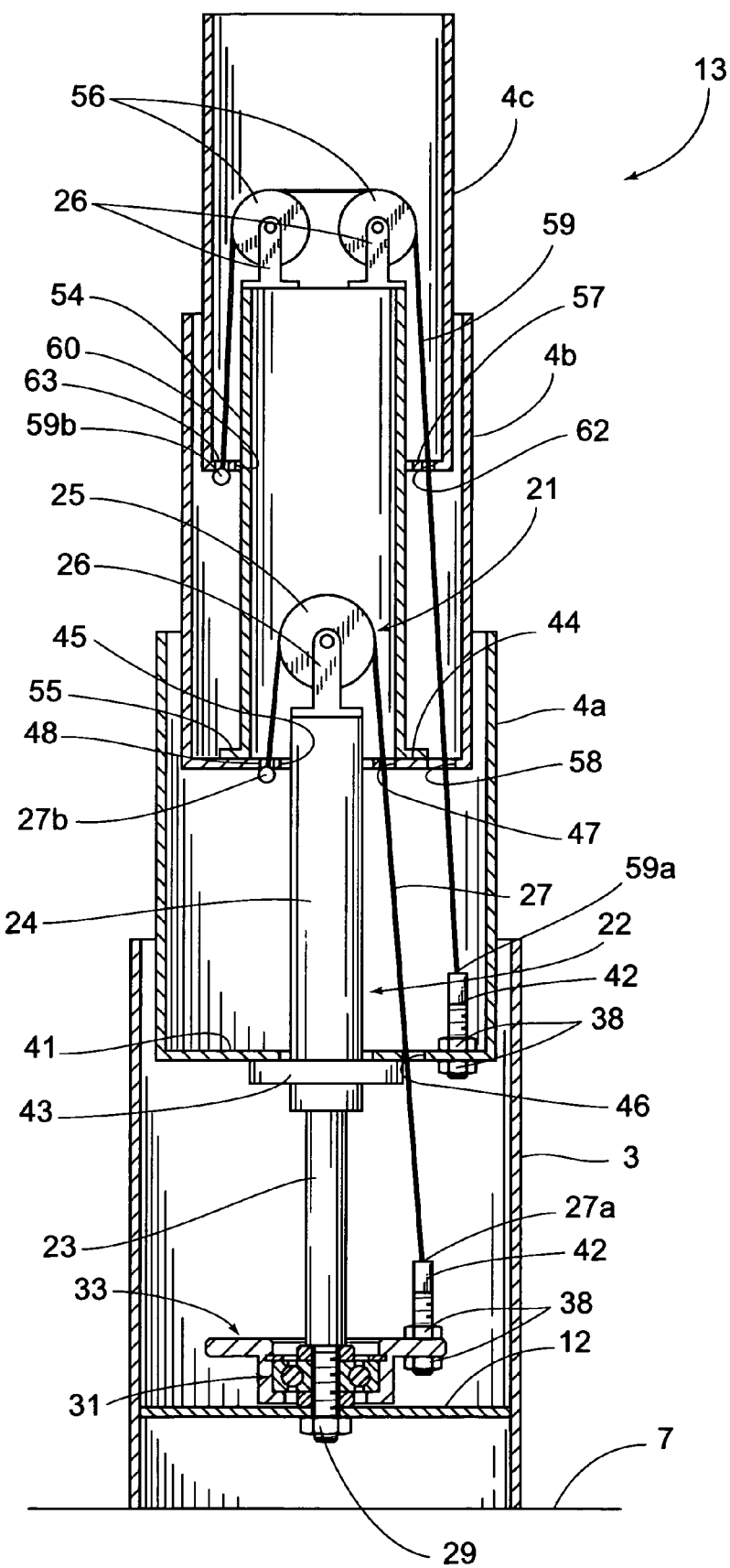
FIG. 7 is a longitudinal sectional view illustrating schematically the support column structure of another embodiment of the present invention.
Figure 8:
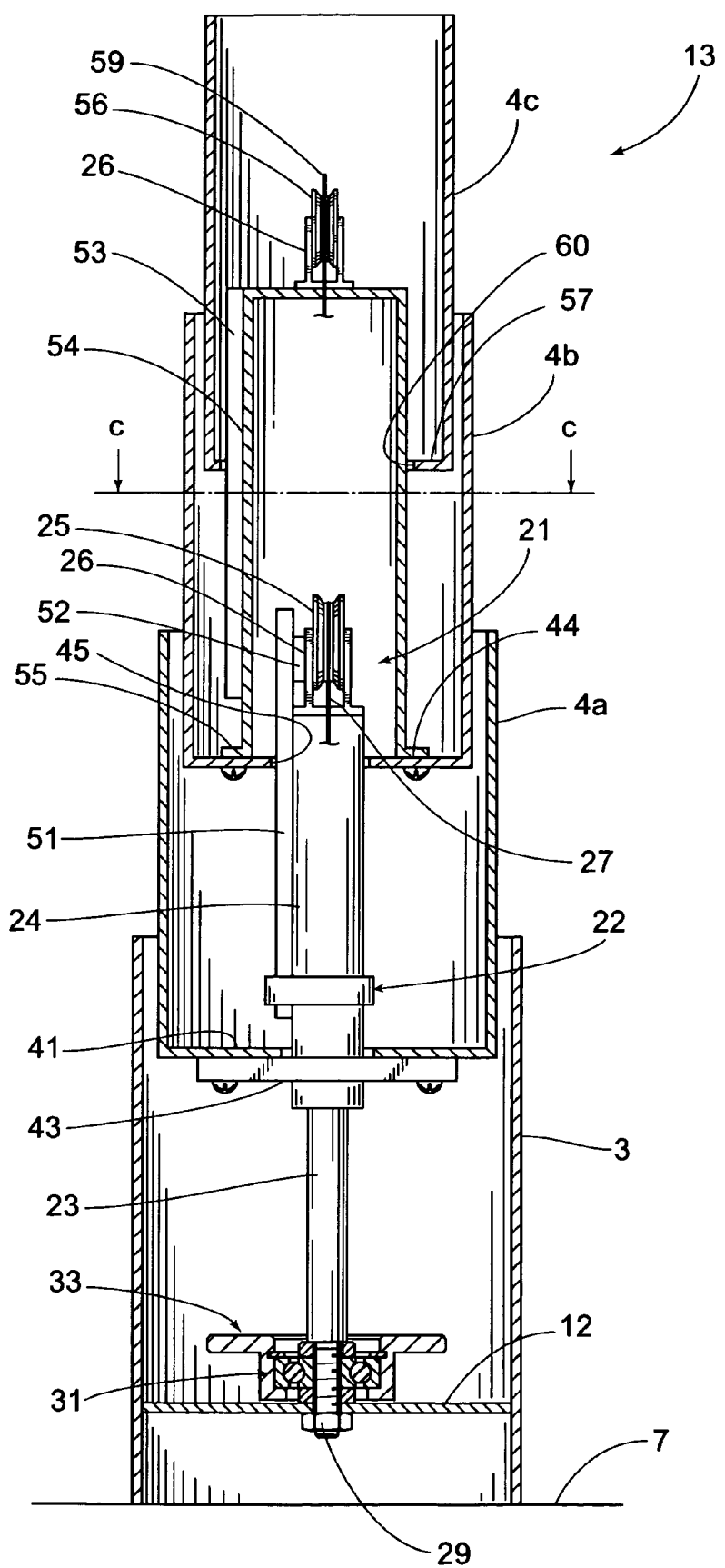
FIG. 8 is a longitudinal sectional view at a position rotated at 90 degrees of FIG. 7 in the embodiment of the present invention.
Figure 9:
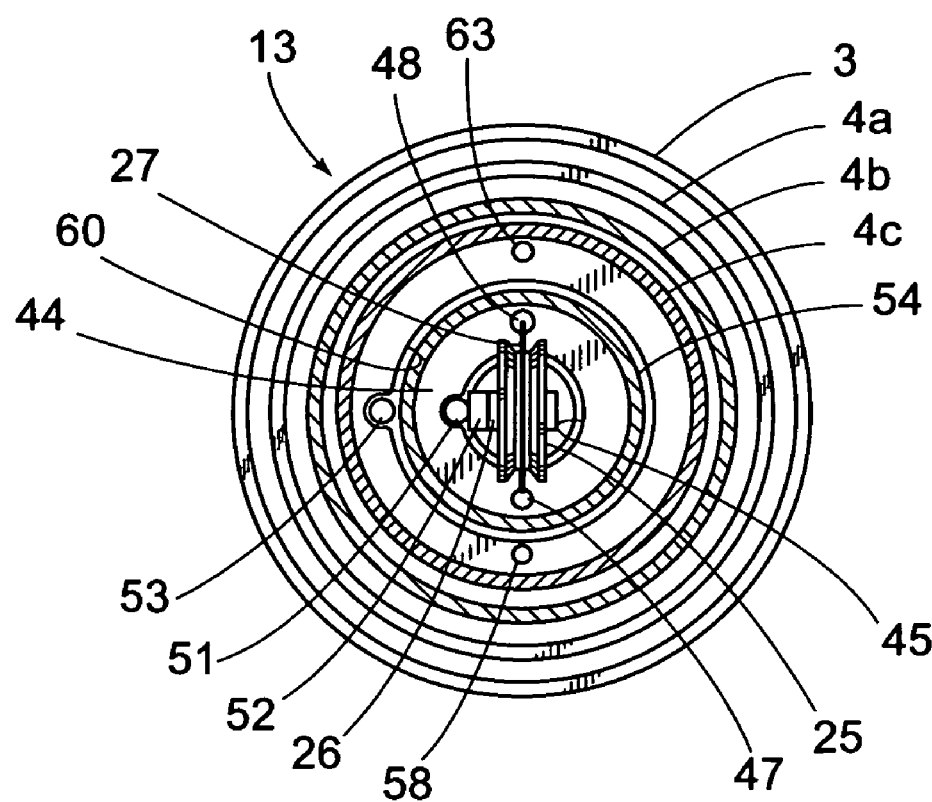
FIG. 9 is a cross-sectional view taken on line c-c in FIG. 8 in the embodiment of the present invention.

Next is a description of a different preferred embodiment of the present invention with reference to the drawings. Additionally, the same reference symbols are used for parts the same as in the embodiment described above and the description about the same portion is omitted for simplicity. FIG. 7 is a longitudinal sectional view for showing schematically a structure of the support column according to this embodiment of the present invention. FIG. 8 is a longitudinal sectional view at a position where FIG. 7 is turned by 90 degrees. FIG. 9 is a cross-sectional view taken on line c-c in FIG. 8.

The upper support column 4 comprises a second support column 4a, a third support column 4b and a fourth support column 4c. Each of the support columns is freely vertically movable and is fitted loosely to one another in a rotatable manner in conjunction with one another. In other word, the second and third support columns 4a, 4b are supported by means of a first longitudinal lever 51 in a rotatable manner in conjunction with the first support column 3. The third support column 4b and the fourth support column 4c are supported by means of a second longitudinal lever 53 in a rotatable manner in conjunction with one another.

An internal support column 54 provided inside the third support column 4b comprises a bottomed cylinder circular tube and is formed integrally with a flange 55 in its upper end. The internal support column 54 is formed with the flange 55 installed downward and the flange 55 is joined to a lower portion of the third support column 4b by means of bolts. On an upper portion of the internal support column 54, two second pulleys 56 are in an axially opposite state provided by means of a support member 26 in a rotatable manner. A wire 59 is wound around the second pulley 56. One end 59a of the wire 59 is fixed to the underside 41 of the second support column 4a, while the other end 59b thereof penetrates through-holes 58, 62 formed on the bottom surfaces 44, 57 of the third and fourth support columns 4b, 4c to be fixed to the underside 57 of the fourth support column 4c. The other end 59b of the second wire 59 is provided with a locking member, which is locked via a hole 63 formed at the axially opposite position to the through-hole 62. In the meantime, the number of the second pulley 56 may be singular and may be arbitrary selected insofar as the wire 59 interferes with no internal support column 54 and further the pulley interferes with no fourth support column 4c. Further, the internal support column 54 may be composed of a rectangular tube.

Due to the structure described above, when applying force vertically to the second support column 4a, the main body 24 rises or falls by the gas damper 22 operating, secondarily. Thus, since main body 24 of the gas damper 22 and the bottom surface 41 of the second support column 4a are supported fixedly by the detachable means to be fixed integrally with each other, the second support column 4a also rises or falls, so that the first pulley 25 moves vertically and subsequently the third support column 4b moves integrally with the first pulley 25. Further, along with the movement of the third support column 4b, the second pulley 56 provided inside the internal support column 54 moves relatively from the second support column 4a, i.e., the one end 59a of the wire 59. Hence, the other end 59b of the second wire 59 pushes up or pulls down the bottom surface 57 of the fourth support column 4c, so that the support column 13 can be extended or retracted.

The second longitudinal lever 53 is annexed to the internal support column 54. As shown in FIG. 9, part of the through hole 60 at the bottom surface 57 of the fourth support column 4c has a cutout portion 61 formed in nearly the same size as an outside dimension of the second longitudinal lever 53 and the second longitudinal lever 53 penetrates the cutout portion 61. Thus, the fourth support column 4c can turn in conjunction with the third support column 4b through the intermediary of the second longitudinal lever 53 and besides, as described above, the third support column 4b is supported so as to be able to turn in conjunction with the main body 24 and the second support column 4a through the intermediary of the first longitudinal lever 51. As a result, the upper support column 4 comprising the second, third and fourth support columns 4a, 4b and 4c is supported so as to be able to turn in conjunction with one another.

Due to the structure described above, even if the fourth support column 4c turns, since the fourth support column 4c can turn in conjunction with the second and third support column 4a, 4b, the wire 59 is prevented from disengaging from the second pulley 56, so that the support column 13 can perform the telescopic motion irrespective of rotating positions of the upper support column 4.

Next is a description of behavior of a structure of the support column 13 in the present embodiment.

First, a description is given for the behavior when the support column 13 is adjusted in height. When extending the support column 13, the operator pushes up the gripper, not shown, provided on the periphery of the second support column 4a to apply force upward to the second support column 4a. Then, along with elongation of the rod 23 caused by the gas damper 22 operating secondarily, the main body 24 rises. Since the main body 24 of the gas damper 22 and the bottom surface 41 of the second support column 4a are supported fixedly by the detachable means to be fixed integrally with each other, the second support column rises and further along with rise of the first pulley 25, the third support column 4b rises integrally with the second support column 4a and the first pulley 25. Further, as a result of the rise of the third support column 4b, since the second pulley 56 provided in the internal support column 54 rises relatively from the second support column 4a, i.e., the one end 59a of the second wire 59, the other end 59b of the second wire 59 pushes up the bottom surface 57 of the fourth support column 4c, thus allowing the support column 13 to be extended.

On the contrary, when retracting the support column 13, when pushing down the gripper to apply force downward to the second support column 4a, along with retracting of the rod 23, the main body 24 lowers and the second support column 4a lowers integrally with the main body 24. Further, due to the lowering of the first pulley 25, the third support column 4b lowers integrally with the first pulley 25. Furthermore, along with the lowering of the third support column 4b, the second pulley 56 provided inside the internal support column 54 lowers relatively from the second support column 4a, i.e., the one end 59a of the second wire 59, so that the other end 59b of the second wire 59 pulls down the bottom surface 57 of the fourth support column 4c, thus allowing the support column 13 to be retracted.

Further, another situation is described where the upper support column 4 comprising the second, third and fourth support columns 4a, 4b, 4c turns relatively to the first support column 3 around an axial direction of the support column 13. As described above, the fourth support column 4c can turn in conjunction with the third support column 4b through the intermediary of the second longitudinal lever 53, the third support column 4b can turn in conjunction with the second support column 4a through the intermediary of the first longitudinal lever 51 and besides the main body 24 and the second support column 4a are fixed integrally with each other. Hence, when the upper support column 4 turns, thus the main body 24 turns, so that the first pulley 25 installed on the upper end of the main body 24 and the second pulley 56 installed on the upper end of the internal support column 54 turn integrally with the upper support column 4. Therefore, since the other end 27b of the first wire 27 wound around the first pulley 25 is locked to the bottom surface 44 of the third support column 4b, the positional relationship between the other end 27b of the first wire 27 and the first pulley 25 remains just unchanged before and after the rotating motion. Similarly, since the ends 59a, 59b of the second wire 59 wound around the second pulley 56 are locked to the bottom surfaces 41, 57 of the second and fourth support column 4a, 4c, respectively, the positional relationship between the ends 59a, 59b of the second wire 59 and the second pulley 56 remains also just unchanged before and after the rotating motion. Consequently, since the positional relationship between the ends 59a, 59b of the second wire 59 and the second pulley 56 remains also just unchanged before and after the rotating motion, the support column 13 can perform the telescopic motion regardless of rotating positions of the upper support column 4.

As just described in the present embodiment, according to the first aspect of the present invention, there is provided a projector 1 comprising a telescopic support column 4 installed on a carrier 6 serving as a base, a lifting and lowering device 21 provided inside a support column 4, a lighting system 2 provided at a distal end of the support column 4, and an electric power unit 5 for supplying power to the lighting system 2. In the projector 1, since the support column 4 is made of an circular tube and turns in conjunction with the lifting and lowering device 21, the support column 4 comprising the circular tubes can perform a telescopic motion without paying any attention to rotating positions of the support column 4.

Further, in the present embodiment just described, according to the second aspect of the present invention, the support column is constituted by loosely fitting a base support column 3 fixed to the base and the upper support column 4 comprising a plurality of support columns that are made smaller in ascending order relative to the first support column 3 acting as the base support column. The plurality of the support columns comprising the upper support column 4 are loosely fitted in a vertically moveable manner and in a rotatable manner in conjunction with each other. Hence, the upper support column 4 can move vertically relative to the first support column 3 fixed to the carrier 6 and is fixed loosely to the first support column 3 in its axial direction. As a result, the support column 13 can be easily adjusted in height even when the upper support column 4 turns arbitrarily.

Furthermore, in the present embodiment just described, according to the third aspect of the present invention, the upper support column comprises second, third and fourth support columns, the lifting and lowering device 21 is loosely fitted into an inside of the second support column 4a in a vertically movable manner, a gas damper 22 acting as a biasing means for biasing the support column 4 in its extending direction is provided, a lower end of the gas damper 22 is fixed to the inner bottom 12 of the first support column 3 and an upper end thereof is provided with the first pulley 25, a first wire 27 is wound around a first pulley 25, and one end 27a of the wire 27 is fixed to a receiving portion 33 that turns in conjunction with the support column 4 and the other end 27b thereof is fixed to a lower portion of the third support column 4b. Consequently, the lifting and lowering device 21 can perform telescopic motion of the support column 4 by utilizing the gas damper 22 biased to an extending direction of the support column 4, so that a burden on an operator can be reduced to enable the telescopic motion of the support column 4 to be rapidly performed.

Moreover, in the present embodiment just described, according to the fourth aspect of the present invention, the upper support column comprises second, third and fourth support columns 4a, 4b and 4c, there is, inside the third support column 4b, provided an internal support column 54 fitted loosely to the fourth support column 4c in a vertically movable manner, the lifting and lowering device 21 is fitted loosely to an inside of the second support column 4a in a vertically movable manner and is equipped with the gas damper 22 serving as the biasing means for biasing the upper support column 4 in its extending direction, the lower end of the gas damper 22 is fixed to the inner bottom 12 of the first support column 3 and an upper end thereof is provided with a first pulley 25, a first wire 27 is wound around the first pulley 25, the one end 27a of the first wire 27 is fixed to a receiving portion 33 that turns in conjunction with the support column 4 and the other end 27b thereof is fixed to the lower portion of the third support column 4b, the second pulley 56 is provided on the upper portion of the internal support column 54, a second wire is wound around a second pulley 56, one end 59a of the second wire 59 is fixed to an underside 41 of the second support column 4a and the other end 59b thereof is fixed to the underside 57 of the fourth support column 4c. Due to the structure described above, even in cases where four-stage are provided, the support column 13 can perform the telescopic motion irrespective of rotating positions of the support columns, thus allowing the support column 13 to perform the telescopic motion.

Further, in the present embodiment just described, according to the fifth aspect of the present invention, there is provided a through hole that the first wire 27 penetrates on the bottom surface of the second, third support columns 4a, 4b. Thus, the first wire 27 is not exposed externally by winding the first wire 27 inside the support column 4. Hence, not only the operator is prevented from touching the first wire 27 to be given no likelihood of physical damage but the appearance of the projector can be improved.

Embodiment 2

Figure 10:
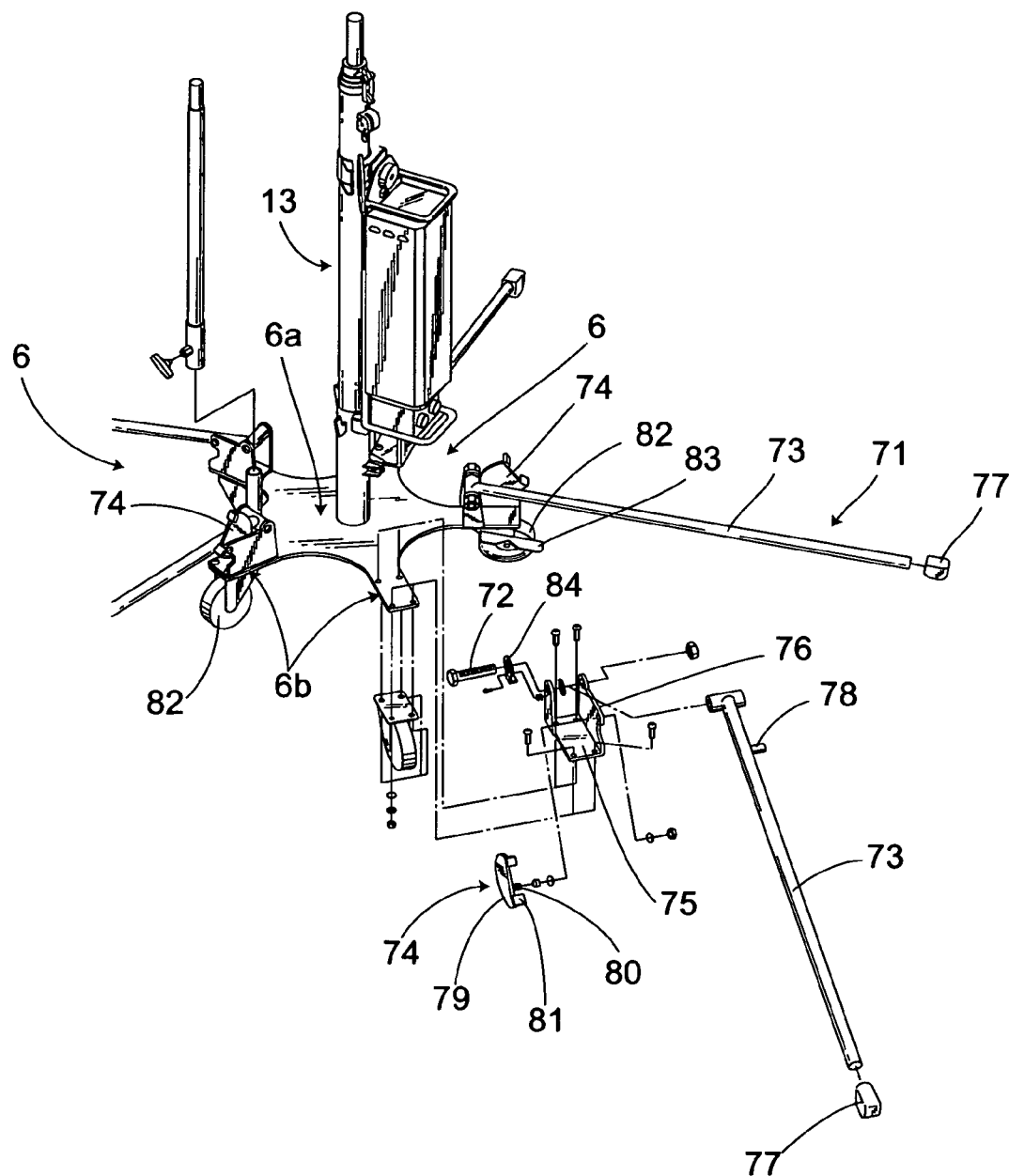
FIG. 10 is a perspective view illustrating a second embodiment of the present invention.

Hereunder is a description of a second embodiment of a projector according to the present invention with reference to FIG. 10. In the second embodiment, a structure of a base 6 is different from that in the first embodiment. Hereinafter, parts that are the same as in the first embodiment are omitted for avoiding duplicate descriptions.

The base 6 is made of a metal and is formed so as to have strength for enabling the installation of the lighting system 2 (FIG. 1) and comprises a base portion 6a for supporting the support column 13 and arms 6b extending radially from the base portion 6a.

An outrigger device 71 supports, by a spindle 72 arranged in the arm 6b, a protruding rod 73 in a rotatable manner and is equipped with a lock mechanism 74 near each spindle 72.

The spindle 72 comprises a nut and a bolt, and hangs rotatably across a rising piece 76 of a flange 75 fixed so as to widen toward the outside of the base 6. A head of the bolt has a hole with the same form as the head of the bolt and is inserted externally by a bolt fixing member firmly to be fixed to the rising piece.

A proximal end of the protruding rod 73 is inserted into the spindle 72. The protruding rod 73 extends radially toward the outside of the base 6 till a protruded position and is supported in a rotatable manner so as to be installed in a standing posture along the support column 13 supported by the base portion 6a. A slip stopper 77 made from a synthetic resin, rubber or the like is mounted on a distal end of the protruding rod 73. The protruding rod 73 is fixed by tightening a nut in a standing state along the support column 13 supported to the base portion 6a.

In the vicinity of the base end (an end at a shaft-fixing side) of the protruding rod 73, the lock mechanism 74 comprises an engaging pin 78 provided in a protruding manner to a lateral side of the protruding rod 73 and a weight member 79 with a given weight. The weight member 79 is supported to the rising piece 76 of the flange 75 in a rotatable manner by means of a shaft 80, which is arranged between the engaging pin 78 of the protruding rod 73 at the protruded position and the spindle 72.

Figure 11:
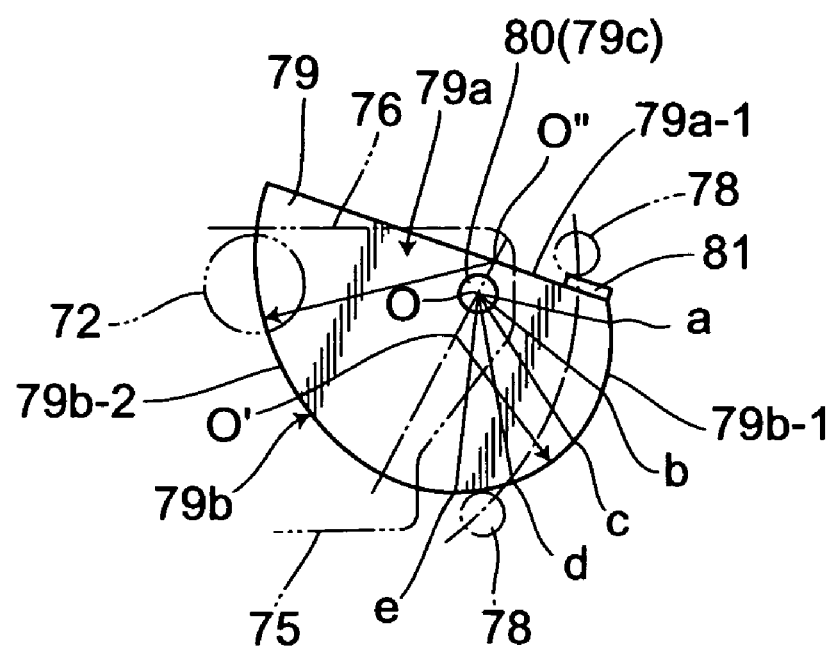
FIG. 11 is an enlarged view of a housed state of a weight member in the second embodiment of the present invention.

As shown in an enlarged view in FIG. 11, an outer circumferential edge of the weight member 79 has a half-round shape composed of a linear edge 79a and a circular-arc-shaped edge 79b and by providing a through hole 79c of the shaft 80 in a biased position, the linear edge 79a forms an upper edge of the weight member 79, while the circular-arc-shaped edge 79b forms an lower edge thereof. A biased position of the weight member 79 is rotatably supported by the shaft 80 so as to be always biased in the reverse direction (the counterclockwise direction in FIG. 11) against a rotating and thus protruding direction of the protruding rod.

In a half portion 79b-1 (a right-hand half portion in FIG. 11) of an outside of the base 6 in the circular-arc-shaped edge 79b, its arc center O' is biased relative to a rotatably supported center of the weight member 79. As a result, distances between the circular-arc-shaped edge 79b and the rotatably supported center become gradually larger as going away from an outside the base 6 closer to an inside of the base 6 (i.e., Oa<Ob<Oc<Od<Oe). Thus, sliding and engaging motion, described latter, between the half portion 79b-1 and the engaging pin 78 is allowed to be performed over positions ranging from an upper limit (a position indicated in FIG. 12(a)) of the protruding position of the protruding rod 73 to lower limit (i.e., a position indicated in FIG. 12(c)) thereof, so that a protruding lock position of the protruding rod 73 is allowed to have a margin. For reference's sake, O" in FIG. 11 indicates the center of a circular-arc of a half portion 79b-2 (a left-hand half portion in FIG. 11) at a base 6 side in the circular-arc-shaped edge 79b.

Figure 15:
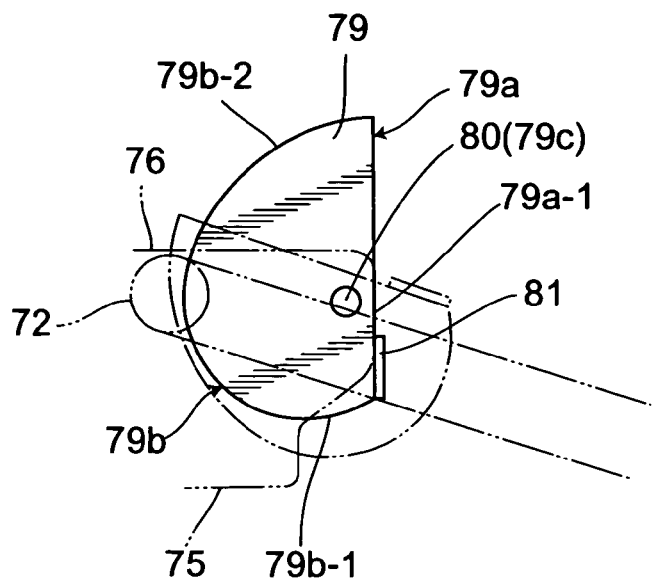
FIG. 15 is an enlarged view illustrating a weight member rotating motion limited state in the same.

The weight member 79 is provided with a locking pin 81, in a protruding manner, for preventing a locking function from becoming ineffective due to excessive rotating motion of the weight member 79 by an abrupt rotating operation of the protruding rod 73. Thus, the weight member 79 is restricted in its rotating motion at a position where the locking pin 81 abuts against the rising piece 76 of the flange 75 (see FIG. 15).

Along with the rotating motion of the protruding rod 73 toward the protruding direction, the engaging pin 78 engages with an end 79a-1 at the outside of the base in the linear edge 79a of the weight member 79 and thus turns the weight member 79 in the protruding direction. Besides, when the protruding rod 73 has turned to the upper limit (a position indicated in FIG. 12(a)) of the protruding position, the engaging pin 78 disengages from the linear edge 79a and then is located at a position where the engaging pin 78 performs slide contact with and engagement with the half portion 79b-1 at the outside of the base in the circular-arc-shaped edge 79b of the weight member 79.

As shown in FIG. 10, casters 82 are provided in the arm 6b to move easily the projector 1. In the meantime, a resting mechanism 83 is provided in at least one caster to hold the projector 1 stable.

Figure 13:
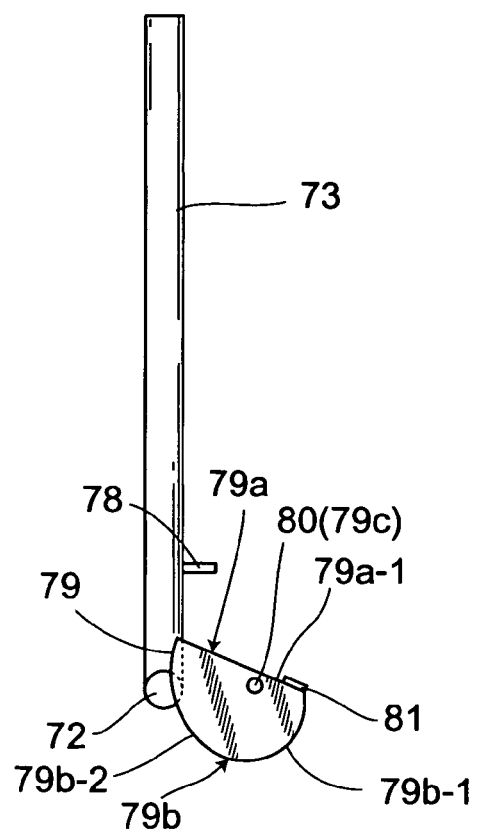
FIG. 13 is a schematic view illustrating the relationship between the protruding rod, the engaging pin and the weight member in the same and especially illustrating a housed state of the protruding rod.
Figure 14:
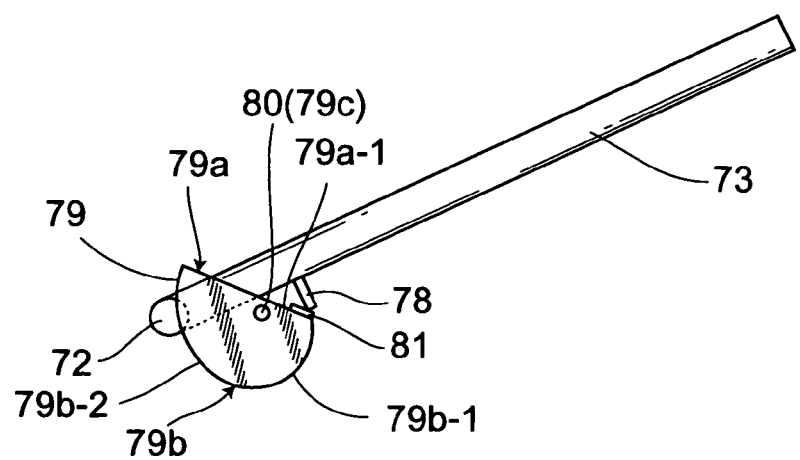
FIG. 14 is a schematic view illustrating the relationship between the protruding rod, the engaging pin and the weight member in the same and especially illustrating a state immediately prior to locking.

Now, a description is given how to use the outrigger device 71 of the embodiment composed of the structure described above. At an initial state, each protruding rod 73 is placed along the support column 13 of a base portion 6a. In this sate, the base 6 can move freely on its installation surface and the protruding rod 73, the engaging pin 78, and the weight member 79 are resting, as shown (see FIG. 13). When applying force to each of the protruding rods 73 toward each protruding direction (an outside of the base 6), tightening force of the spindle 72 is weakened. In other word, since a bolt head of the spindle 72 is fixed by the bolt fixing member 84, the nut turns counterclockwise together with the protruding rods 73 to weaken the tightening force of the spindle 1, so that the protruding rods 73 can turn to the protruding directions. Then, when rotating the protruding rod 73, in the process of the rotating, the engaging pin 78 engages with the upper edge of the weight member 79, i.e., the edge 79a-1 (an outer end) of an outside of the base 6 in the linear edge 79a (see FIG. 14).

Figure 12:
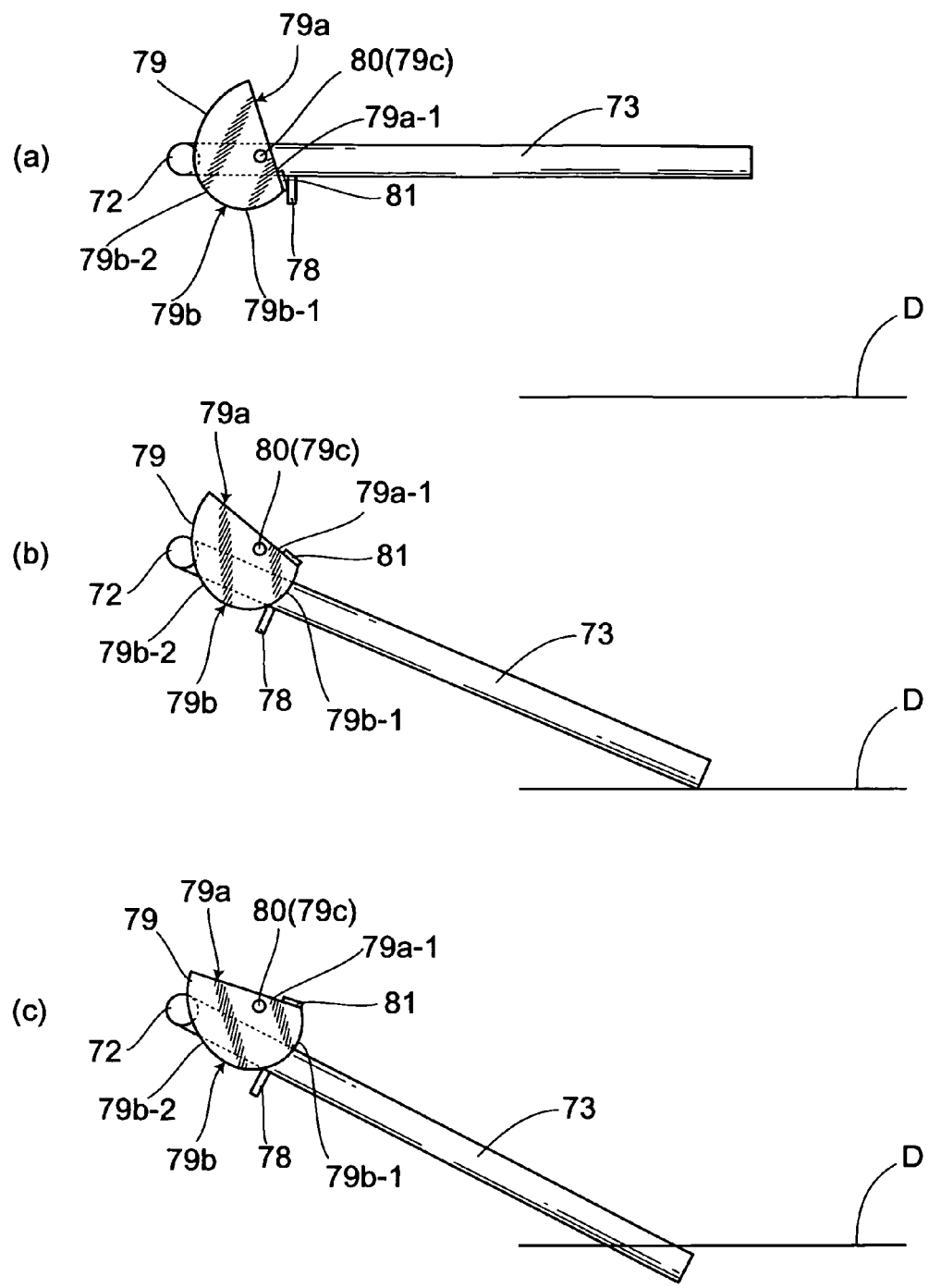
FIG. 12(a) is a schematic view illustrating relationship between a protruding rod, an engaging pin and the weight member in the same and especially illustrating a protruded upper-limit position of the protruding rod.
FIG. 12(b) is a schematic view illustrating the relationship between the protruding rod, the engaging pin and the weight member in the same and especially illustrating a protruded intermediate position of the protruding rod.
FIG. 12(c) is a schematic view illustrating the relationship between the protruding rod, the engaging pin and the weight member in the same and especially illustrating a protruded lower-limit position of the protruding rod.

When rotating the protruding rod 73 continuously in this state, the weight member 79 turns against its own biasing direction integrally with the protruding rod 73 and the protruding rod 73 reaches the upper limit (the position in FIG. 12(a)) of the protruding position. Then, the engaging pin 78 gets on the outer end 79a of the linear edge 79a-1, so that the engaging pin 78 and the linear edge 79a disengage from each other. At this moment, the weight member 79 turns in its own biasing direction, i.e., in the reverse direction against the protruding direction of the protruding rod 73 and then allows the half portion 79b-1 of the outside of the base 6 in the circular-arc-shaped edge 79b to slide-contact and engage with the engaging pin 78. Thus, the load of the weight member 79 is applied to the engaging pin 78 to restrain the protruding rod 73 from rotating toward the housing direction (the direction toward the base 6) of the protruding rod 73, thus locking a protruding state of the protruding rod 73. Accordingly, the protruding state of the protruding rod 73 is automatically locked that has protruded radially toward the outside of the base 6, so that the protruding rod 73 locked fixes the base 6 to make the base 6 unmovable on the installation surface.

Further, as described above, in a state where the protruding rod 73 exists between the upper-limit (the position in FIG. 12(a)) and the lower-limit positions (the position in FIG. 12(c)) of the protruding positions, the engaging pin 78 slide-contacts and engages with the half portion 79b-1 at the outside of the base in the circular-arc-shaped edge 79b of the weight member 79. Hence, the protruding state of the protruding rod 73 can be arbitrarily locked within the range from the upper limit to the lower limit of the protruding positions. Consequently, by adjusting separately each of the locking positions of the protruding rods 73 arbitrarily within the range from the upper-limit to the lower-limit of the protruding positions, the base base 6 can be balanced horizontally to be able to be stably and certainly fixed on the installation surface.

Besides, even if operating abruptly the protruding rod 73 in the protruding direction and thus the weight member 79 turns abruptly clockwise, the weight member 79 is restrained from rotating at a position where the engaging pin 81 abuts against the rising piece 76 and then turns in its own biasing direction to return to a predetermined state, thus engaging with the engaging pin 78 as described above to lock automatically the protruding state of the protruding rod 73.

On the other hand, when moving the base 6 in its fixed state, by rotating separately each of the left-hand and right-hand protruding rods 73 in the direction of the base 6, the engaging pin 78 slides toward the linear edge 79a to release automatically the slide-contact and engagement between the engaging pin 78 and the circular-arc-shaped edge 79b. Further, when rotating vertically, the protruding rod 73 can be held in a standing posture by increase in tightening force caused by the spindle 72. Namely, due to the fixed state of the bolt head of the spindle 72 by means of the bolt fixing member 84, the nut turns clockwise together with the protruding rod 73 to increase the tightening force of the spindle 72, so that the protruding rod 73 can be held vertically. Thus, each protruding rod 73 is allowed to be housed at the initial position.

The outrigger device according to the present invention is structured as described above. Hence, the same effect as that in the first embodiment can be obtained and at the same time by protruding radially each protruding rod 73 to the outside of the base 6, the load of the weight member 79 is applied to the engaging pin 78 to Thus restrain the protruding rod 73 from rotating toward the housed direction and thus the protruding state of each protruding rod 73 is automatically locked. Besides, by adjusting separately the locked state of each of the left-hand and right-hand protruding rods 73 within the range from the upper limit to the lower limit of the protruding positions to balance the base 6 horizontally, the base 6 can be fixed stably and certainly on the installation surface. Further, by rotating each protruding rod 73 in the direction of the base 6, each protruding rod 73 can be held vertically to the base 6.

Accordingly, an ready-to-assemble and inexpensive outrigger device 71 can be provided in which base fixing performance with excellent stability equivalent to that of the conventional system can be obtained, maneuverability in use and after use is substantially improved, and besides its structure is extremely simple such that its principal part comprises only the left-hand and right-hand protruding rods and a plate-like weight member 79.

Embodiment 3

Hereunder is a description of one example of a drop prevention mechanism according to a third embodiment of the present invention with reference to FIGS. 16 to 20. In the third embodiment, the support column 13 differs from that in the first embodiment and parts the same as in the first embodiment are hereinafter omitted to avoid overlapping.

Figure 16:
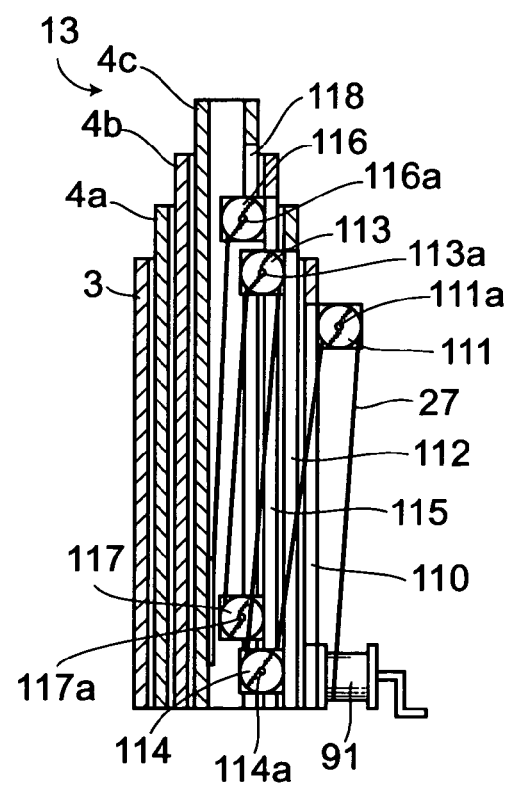
FIG. 16 is a longitudinal sectional side view illustrating one example of a telescopic support column equipped with a drop preventing mechanism 119 in a third embodiment of the present invention.
Figure 17:
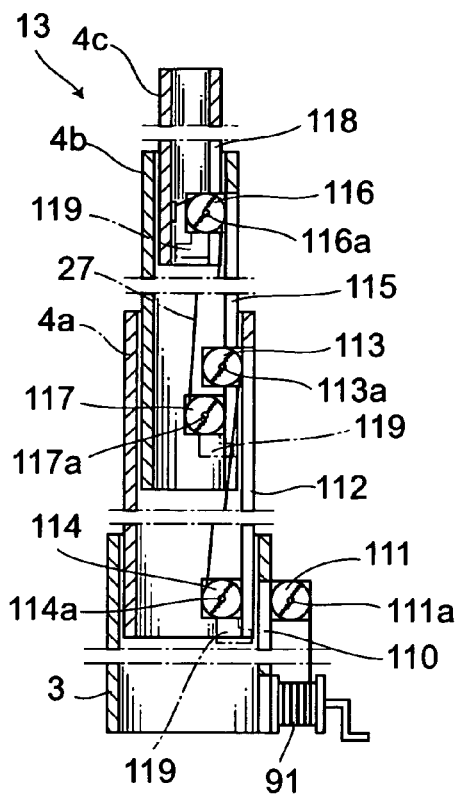
FIG. 17 is a longitudinal sectional side view of an extended state of the telescopic support column in the same.

FIGS. 16, 17 are each a longitudinal sectional side view of one example of the support column 13 to be installed with the drop prevention mechanism according to the present embodiment. In the drawings, numeral symbol 3 denotes a first support column acting as a base support column fixed vertically on the carrier 6. A first cutout portion 110 is formed vertically on a peripheral wall of the first support column 3. Numeral symbol 91 denotes a winch fixed at a lower end of the first support column 3. Numeral symbol 111 denotes a first pulley (a fixed pulley) that is fixed and held on an upper end of the first support column 3 in a rotatable manner centering around a rotating axis 111a. The winch 91 may be laid not on the first support column 3, but on the other position, e.g., the carrier 6.

Reference symbol 4a denotes a second support column constituting an upper support column that is fitted loosely into an inside of the first support column 3 in a vertically slidable manner and a second cutout portion 112 is formed vertically on a peripheral wall of the second support column 4a. Striding across the second cutout portion 112, a second upper pulley (a fixed pulley) 113 is fixed and held on an upper end of an inner wall of the second support column 4a in rotatable manner centering around a rotating axis 113a. On a lower end of the same, a second lower pulley (a movable pulley) 114 is supported in a rotatable manner centering around a rotating axis 114a, which is further supported in a slightly vertically movable and lockable manner with the pulley 114. Reference symbol 4b denotes a third support column that is fitted loosely into the second support column 5 in a vertically sidable manner and acts as the upper support column. A third cutout portion 115 is formed along the vertical direction on a peripheral wall of the third support column 4b. Striding across the third cutout portion 115, a third upper pulley (a movable pulley) 116 is supported on an upper end of an inner wall of the third support column 4b in a rotatable manner centering around a rotating axis 116a, which is further supported in a slightly vertically movable and lockable manner with the pulley 116. On a lower end of the same, a third lower pulley (a movable pulley) 117 is supported in a rotatable manner centering around the rotating axis 117a, which is further supported in a slightly vertically movable and lockable manner with the pulley 117. Besides, the second upper pulley 113 and the second lower pulley 114 are provided at a position which these pulleys pass through the third cutout 115.

Reference symbol 4c denotes a fourth support column that is fitted loosely into the third support column 4b in a vertically slidable manner and acts as an upper support column. The fourth support column 4c is formed with a fourth cutout portion 118 vertically on a peripheral wall of the fourth support column. The third upper and lower pulleys 116, 117 are provided at a position where these pulleys pass through the fourth cutout portion 118. By thus providing each of the pulleys 113, 114, 116, 117 at the positions where these pulleys pass through the cutout portions 115, 118, respectively, each of the circular tubes 3, 4a, 4b, 4c can be decreased in inner diameter, enabling reduction in weight compared to a structure for providing moving spaces of these pulleys at outsides of the circular tube. Accordingly, hoisting operation can be performed with extremely light operational force to improve working efficiency and further In addition to advantages for enabling easy movement due to reduction in size and weight, extremely useful advantages are obtained in terms of ensuring more the performance of the drop preventing mechanism described latter.

The lighting system 2 is mounted on the upper end of the fourth support column 4c. Numeral symbol 27 denotes a wire whose one end is fixed to the fourth support column 4c that is an upper support column with the smallest diameter. The wire 27 is wound sequentially around the pulleys 116, 117, 114, 111 and the other end thereof is fixed to the winch 91. The wire is rolled up by an operation of the winch 91 to raise the second, third, and fourth support columns 4a, 4b, 4c and extends the support column 13 to a predetermined height, so that a height of the lighting system 2 mounted on an upper end of the fourth support column 4c can be arbitrarily adjusted.

Figure 18:
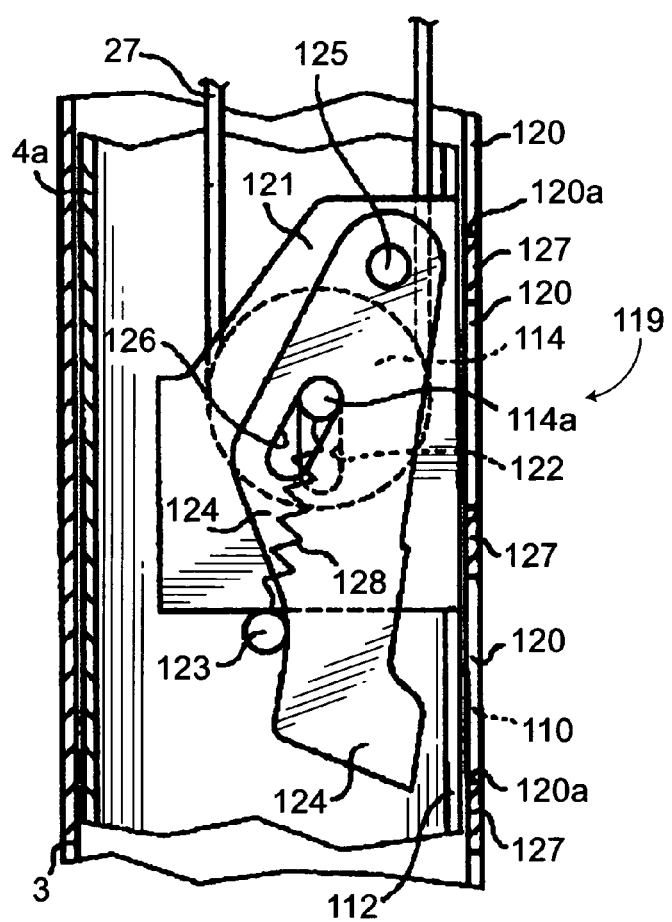
FIG. 18 is an enlarged sectional view in the same.
Figure 19:
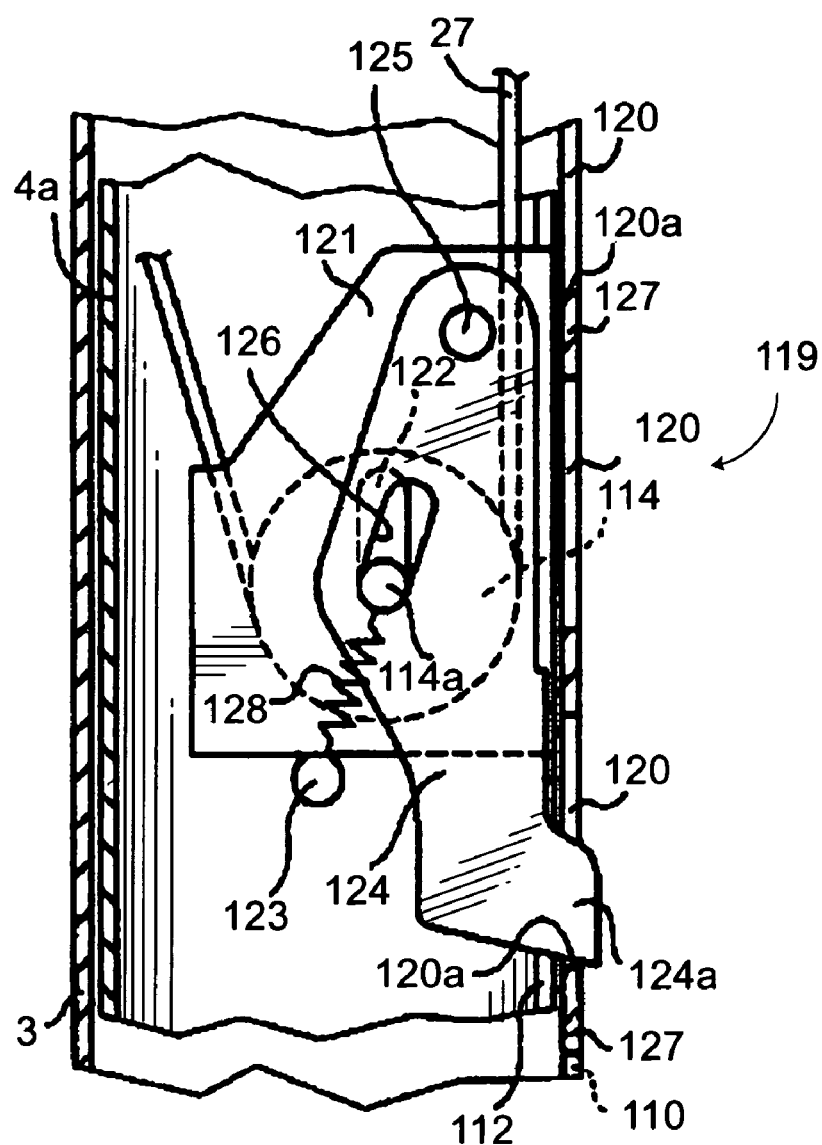
FIG. 19 is a longitudinal sectional side view illustrating an operating state of the drop preventing mechanism shown in FIG. 18.
Figure 20:
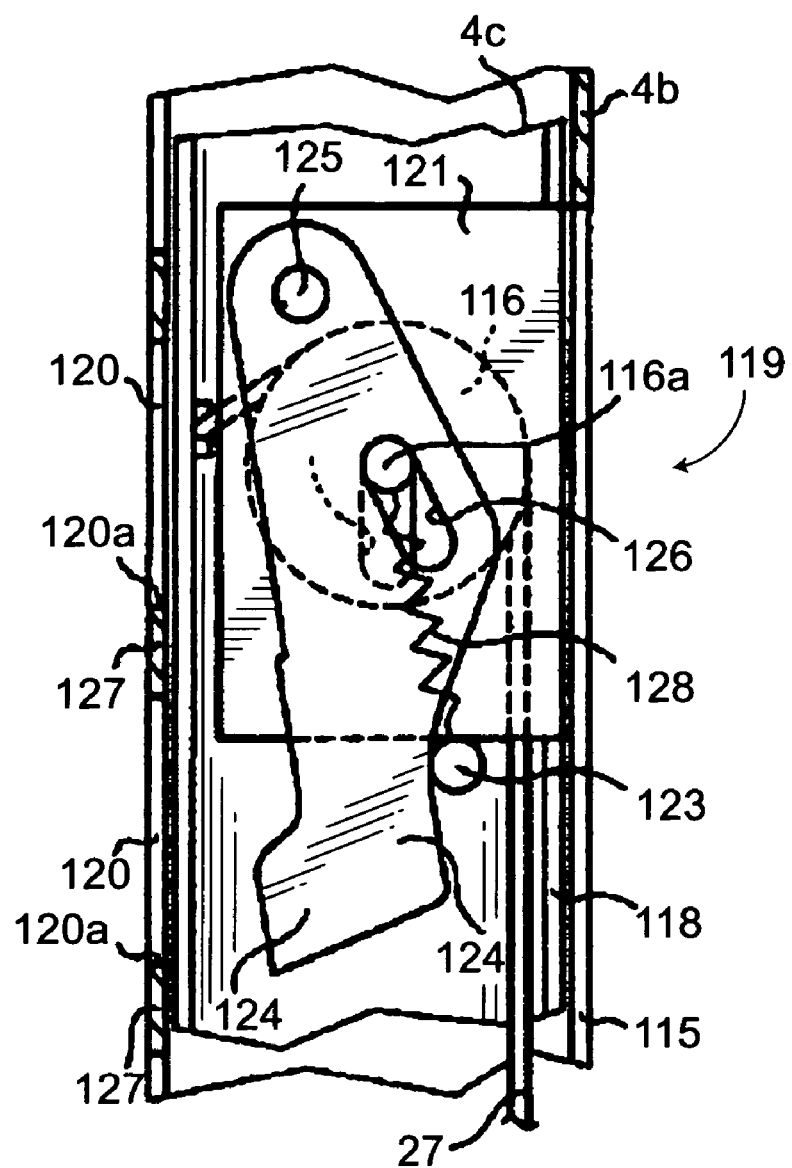
FIG. 20 is an enlarged sectional view illustrating a different example of the drop preventing mechanism in the same.

Thus, in the present embodiment, the second lower pulley 114 of the support column 13, the third upper pulley 116 and the lower third pulley 117 that are structured described above are supported, as referred to above, in a slightly vertically movable and lockable manner together with the rotating shafts 114a, 116a, 117. Thus, the above three pulleys are formed into movable pulleys. Further, there is provided a locking claw 119 for rotating in conjunction with vertical movement of each of the pulleys 114, 116, 117. Furthermore, in arbitrary positions of the peripheral walls of the first support column 3, the second support column 4a and the fourth support column 4c, there is provided an engaging portion 120 with which each engaging claw 119 engages at its protruding portion. Moreover, a drop preventing mechanism 119 is mounted that is intended to prevent separately dropping of the second support column 4a, the third support column 4b and the fourth support column 4c, so that drop prevention of the support column 13 is intended as a whole. Hereunder, the structure of the drop prevention mechanism is detailed with reference to FIGS. 18 to 20. In the meantime, FIGS. 18, 19 show a drop preventing mechanism 119 of the second support column 4a, while that 119 of the third support column 4b has the same structure and therefore its description is omitted. Further, FIG. 20 shows a. Also in this case, the drop prevention mechanism 119 is identical to that of the second and third support columns 4a, 4b except for a point that a position where the protruding direction of the locking claw 124 and the engaging portion 120 are formed is inverted relatively to that of the drop prevention mechanism 119 of the second and the third support columns 4a, 4b. Hence, a description of the drop prevention mechanism 119 of the fourth support column 4c is omitted.

Figure 21:
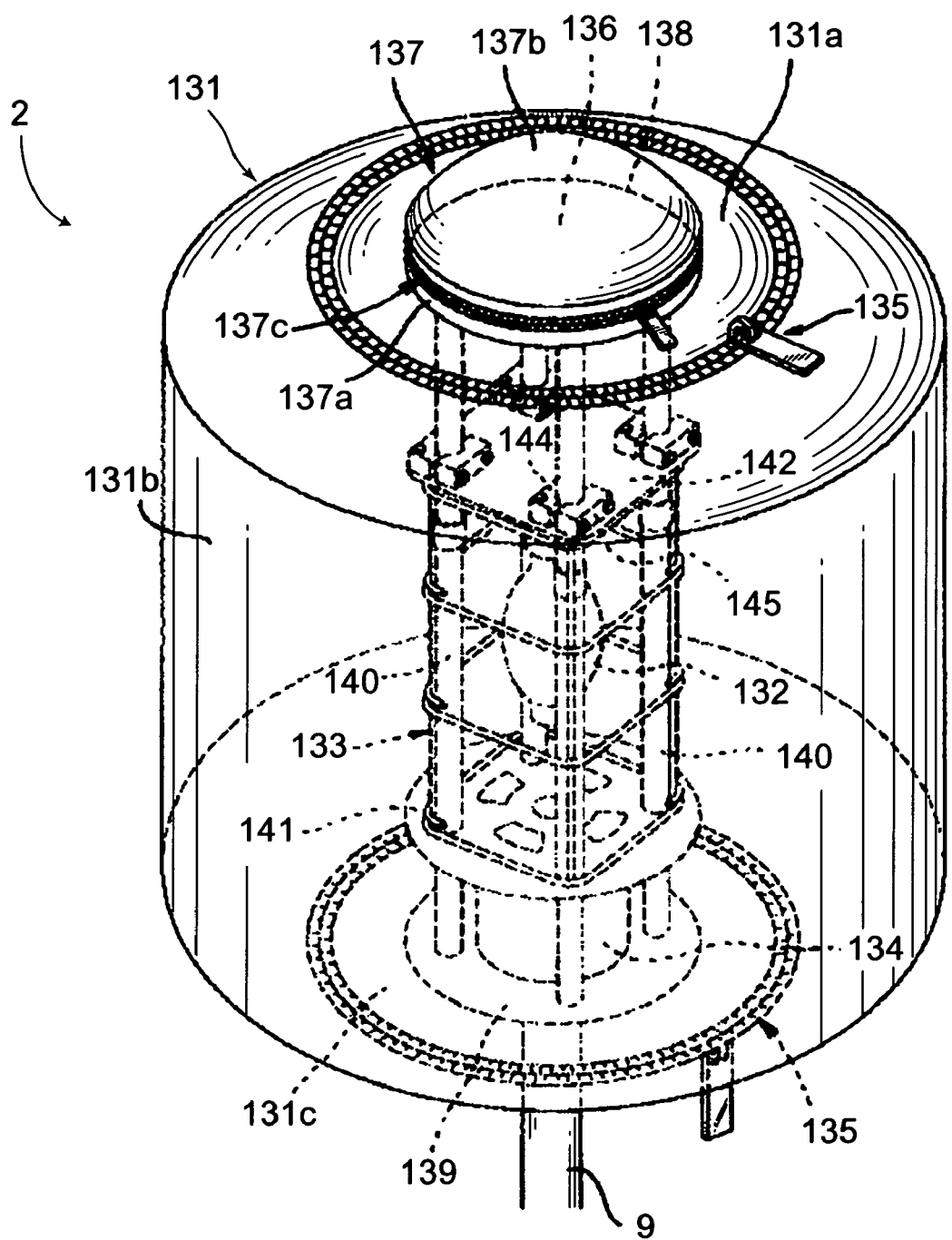
FIG. 21 is a perspective view illustrating one example of the projector in a fourth embodiment of the present invention.
Figure 22:
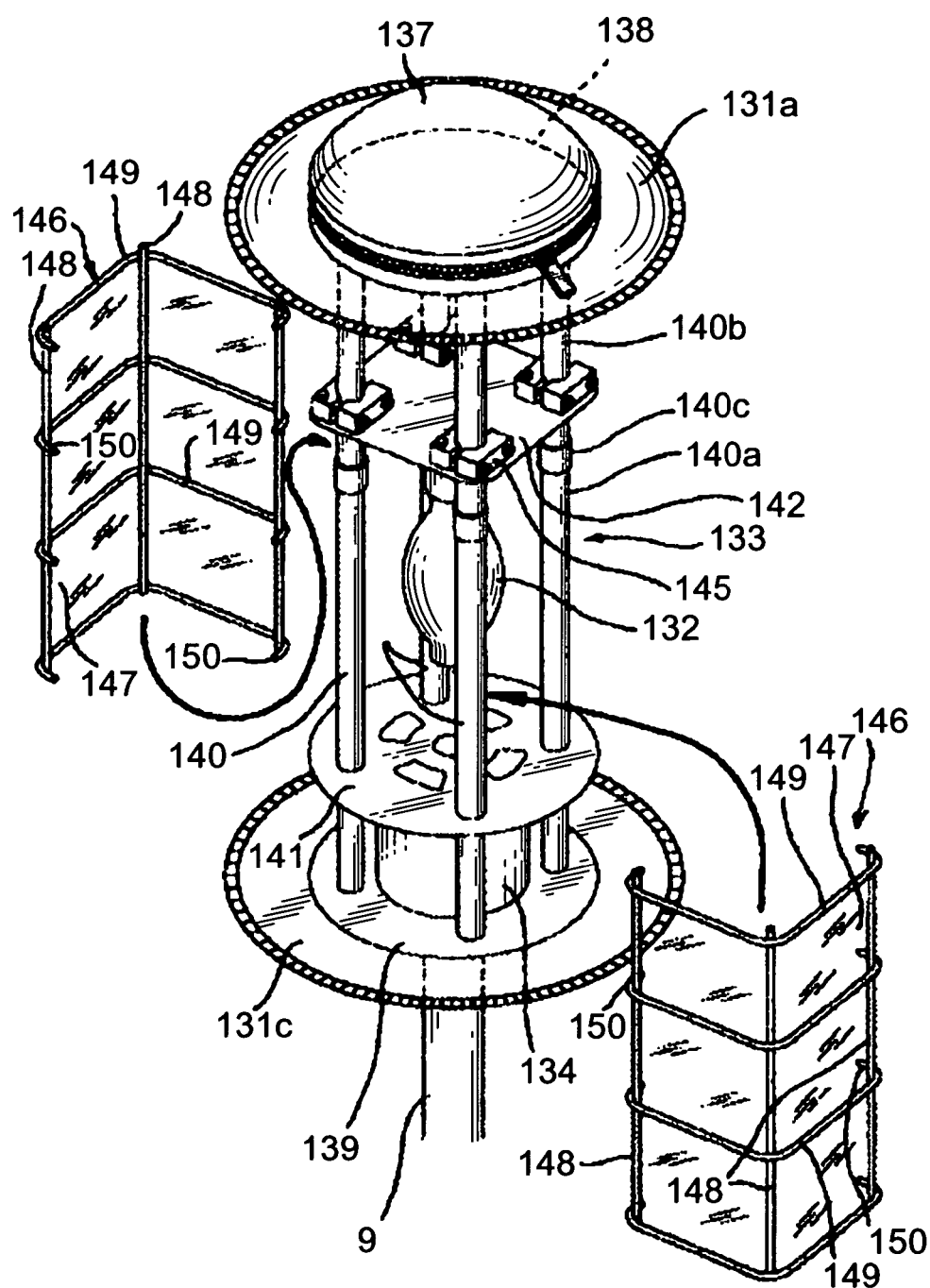
FIG. 22 is an exploded perspective view of a state where a balloon intermediate portion in FIG. 21 is detached.

In FIGS. 21, 22, numeral symbol 121 denotes a pair of bearings fixed to a lower portion of the second support column 4a. The bearings 121 are fixed across a second cutout portion 112. Numeral symbol 122 denotes a pair of vertically extended spindle holes each provided in the bearing 112. A rotating shaft 114a of the second lower pulley 114 is fitted loosely to the spindle hole 122. Thus, the second lower pulley 114 acts as a movable pulley that can be locked at lifted and lowered positions together with the rotating shaft 114a. Numeral symbol 123 denotes a fixed pin at a lower side of a second bearing 121 and numeral symbol 124 denotes a locking claw provided at an adjacent position to the second lower pulley 114.

The locking claw 124 is supported in a rotatable manner by a fixed spindle 125 provided at a position near a spindle hole 122 in the second bearing 121, i.e., in the present embodiment an obliquely upper position of the spindle hole 122. The locking claw 124 is provided with a guide hole 126 that has a vertically long extended-hole form and slopes slightly obliquely leftwards. When the rotating shaft 114a is fitted loosely to the guide hole, the guide hole 126 turns the locking claw 124a toward a peripheral wall of the second support column 4a at a lowering lock position of the rotating shaft 114a and protrudes a distal claw portion 124a of the locking claw 124 from the second cutout portion 112 to makes the locking claw 124 withdraw toward an inner side of the second support column 4a at a rising lock position of the rotating shaft 114a.

Numeral symbol 120 denotes engaging portions, a plurality of which is formed in multistage-shape by spacing, at arbitrary intervals, protruding pieces 127 that protrude in a cantilevered manner at a lateral edge of the first cutout portion 110 of the first support column 3 acting as a base support column loosely fitted into the second support column 4a. The engaging portions 120 engages with a distal claw 124a of the engaging claw protruding from the second cutout portion 112 to prevent the second support column 4a from dropping. Additionally, the engaging portion 120 is not limited to one formed as described above and instead the engaging portion may be used that is positioned at a place where it engages with the distal claw 124a of the engaging claw protruding from the second cutout portion 112. It may be formed, e.g., by an opening made in multistage form at a lateral side of the first cutout portion 110. Numeral symbol 128 denotes a spring that is hung between the rotating shaft 114a and the pin 123 and biases the second pulley 114 toward the lowering lock position together with the rotating shaft 114a. The biasing force may be on the order of locking reliably the lower pulley 114 at its lifted position by tensile strength of the wire 27 together with the rotating shaft 114.

That is to say, while the tensile strength is being applied to the wire 27, as shown in FIG. 18, the second lower pulley 114 is pulled up at an upper portion of the spindle hole 122, i.e., the rising lock position together with the rotating shaft 114a and therefore the engaging claw 124 is also withdrawn. As long as the tensile strength of the wire 27 is not lost, this state is kept to exert no influence on the lifting and lowering of the second support column 4a.

When the wire 27 is cut to allow the tensile strength cease from acting, however, as shown in FIG. 19, the second pulley 114 drops by its own weight and the biasing force of the spring 128 to come down to a lower portion of the spindle hole 122, i.e., the lowering lock position together with the rotating shaft 114a. As a result, due to movement of the guide hole 126 along the rotating shaft 114a, the locking claw 124 turns toward the peripheral wall of the second support column 4a and then the distal claw 124a protrudes from the second cutout portion 112 to engage with any of the engaging portions, so that the second support column 4a stops dropping. At this time, the movable pulley 114 is schemed to be biased toward its lowering lock position by means of the spring 128, so that the rotating shaft 114a is forced to lower together with the movable pulley 114 and thus the distal claw 124a of the engaging claw protrudes without fail. Further, even if pushing up force is exerted on the engaging claw 124 due to a collision or the like of the distal claw 124a against a bottom wall 120a of the engaging portion 120, the fixed shaft 125 functions as a stopper to hamper the backward movement of the engaging claw 124 and further even if force of thrusting back the engaging claw 124 inward is exerted on the engaging claw 124 due to a collision or the like of the distal claw 124a against an inner wall of the first support column 3, the rotating shaft 114a in the guide hole 126 functions as a stopper to prevent the backward movement of the engaging claw 124. Hence, a possibility of the backward movement of the engaging claw 124 can be prevented without fail while preserving the biasing force of the spring 128 on the order of withdrawing inward certainly the engaging claw 124 by the tensile strength of the wire 27.

This behavior is the same as the case with the drop prevention mechanism 119 of the third support column 4b whose illustration is omitted. A plurality of the engaging portions 120 for engaging with the engaging claw 124 of the third lower pulley 117 is provided at a position where the engaging portions 120 can engage with the distal claw 124a of the locking claw 124 protruding from the cutout portion 115 of the third support column 4b, i.e., is provided at a lateral side of the second cutout portion 112. Further, the drop prevention mechanism 119 of the fourth support column 4c shown in FIG. 20 is the same as described above. That is, a plurality of the engaging portions 120 for engaging with the engaging claw 124 of the third upper pulley 116 is provided at a position where the engaging portions 120 can engage with the distal claw 124a of the engaging claw 124 that has turned toward the peripheral wall opposed to the cutout portion 118 of the fourth support column 4c.

In the support columns equipped with the drop prevention mechanism 119 structured as described above in the present embodiment, as shown in FIG. 17, when operating the winch 91, the wire 27 is rolled up and then the fourth support column 4c rises initially. At this time, the fourth support column 4c goes through the pulleys 116, 117 due to the cutout portion 118 to rise. Subsequently, the third and second support columns 4b, 4a are sequentially raised similarly to realize a raised state of these support columns as shown in FIG. 20. If the wire 27 were cut, the second lower pulley 114 would lower by its own weight and biasing force of the spring 128, shifting the state from that shown in FIG. 20 to that shown in FIG. 19 and then the locking claw 124 turns toward of the cutout portion 112, so that the distal claw 124a engages with the engaging portion 120. Hence, the second support column 4a stops dropping. Further, the third support column 4b not shown and the fourth support column 4c shown in FIG. 20 behave in the same way and therefore, as a whole, the second support column 4a, the third support column 4b and the fourth support column 4c can be minimally prevented from dropping. As a result, the lighting system 2 installed on the upper end of the fourth support column 4c can be prevented from damaging and besides the safety of workers and passengers that are present in the vicinity can be ensured.

In the meantime, the structure of the support columns is not limited to that shown in the drawings. The number of the support columns constituting the upper support column and the number of the pulleys provided and a position where the pulleys are installed are arbitrarily varied and together with the variations, the movable pulleys, the engaging claw, the spring and the engaging portions or the like that have been described above may be provided at arbitrary positions to structure the drop prevention mechanism 119. It goes without saying that these modifications are available.

The present embodiment can obtain the same effects as that of the first embodiment described above. Besides, in a state where the tensile strength is acting on the wire 27, the movable pulley 114 resists to the biasing force of the spring 128 to be able to be surly locked at its lifted position together with the rotating shaft 114a. In this state, the locking claw 124 is at a position where the locking claw 124 is drawn back toward an inside of the second support column 4a to allow the support column 13 to rise and lower without exerting any influence. Further, if the tensile strength is lost due to cutting or the like of the wire 27, the locking claw 124 protrudes without fail by the biasing force of the spring 128 to engage with the engaging portion 120, thus preventing the support column 13 from dropping. Besides, even if, in this sate, the support column 13 is accelerated to drop due to any cause, thus applying the force for drawing back the locking claw 124, the fixed shaft 125 for supporting the locking claw 124 and the rotating shaft 114a fitted loosely to the guide hole 126 of the locking claw 124 function as the stoppers. Hence, the engaging state between the locking claw 127 and the engaging potion 120 can be sustained without fail while preserving the biasing force of the spring 128 on the order of reliably withdrawing the locking claw 127 by the tensile force of the wire 27. Consequently, in case of cutting of the wire 27, impacts stay little that act on arbitrary equipment, installed on the upper end of the support column 13, including the lighting lamp, a speaker or the like. Then, the advantages of the conventional drop prevention mechanism 119 that these equipments can be prevented from being damaged and besides the safety of workers and passengers that are present in the vicinity can be ensured are allowed to be more fully effective to enable reliability to be improved as a product. Besides, extremely excellent effects can be exercised that permits efficient working without exerting any influence on normal performance of the support column 13.

Embodiment 4

With regard to a structure of a projector according to a fourth embodiment, a description is given with reference to accompanying drawings. In this fourth embodiment, a structure of a lighting system 2 differs from that of the first embodiment described above and hereinafter parts the same as in the first embodiment are omitted to avoid overlapping.

As shown in FIGS. 21, 22, a projector 1 is equipped with, inside a balloon 131, a lighting system 2 comprising an electric bulb 132, a holding frame for holding the bulb 132, and an air sucking device 134 (a balloon inflating means) for inflating the balloon 131. Electric power from an electric power unit 5 (FIG. 1) is fed to the electric bulb 132 and the air sucking device 134 to light up the electric bulb 132 with the balloon inflated. Glare of the electric bulb 132 is decreased by making irradiated light passing through the balloon 131 and besides irradiated light illuminates a wide range. Thus, the lighting system is formed.

The balloon 131 comprises an upper portion 131a, an intermediary portion 131b and a lower portion 131c that are formed from cloth, a synthetic resin sheet or the like through which the irradiated light is allow to pass while decreasing the glare of the irradiated light from the electric bulb 132 and besides which are possessed of desired endurance, thermal resistance, weather resistance, water resistance, flexibility or the like. The upper portion 131a, the intermediary portion 131b and the lower portion 131c are joined detachably to one another by a fastener type joining means (a engageable and disengageable means) 135 to be formed so as to easily replace the intermediary portion 131b.

The fastener type engaging means 135 is a well-known one where the arrangement of the teeth composed of male and female teeth engages with and disengages from each other by sliding an opening and closing metal clasp.

Figure 25:
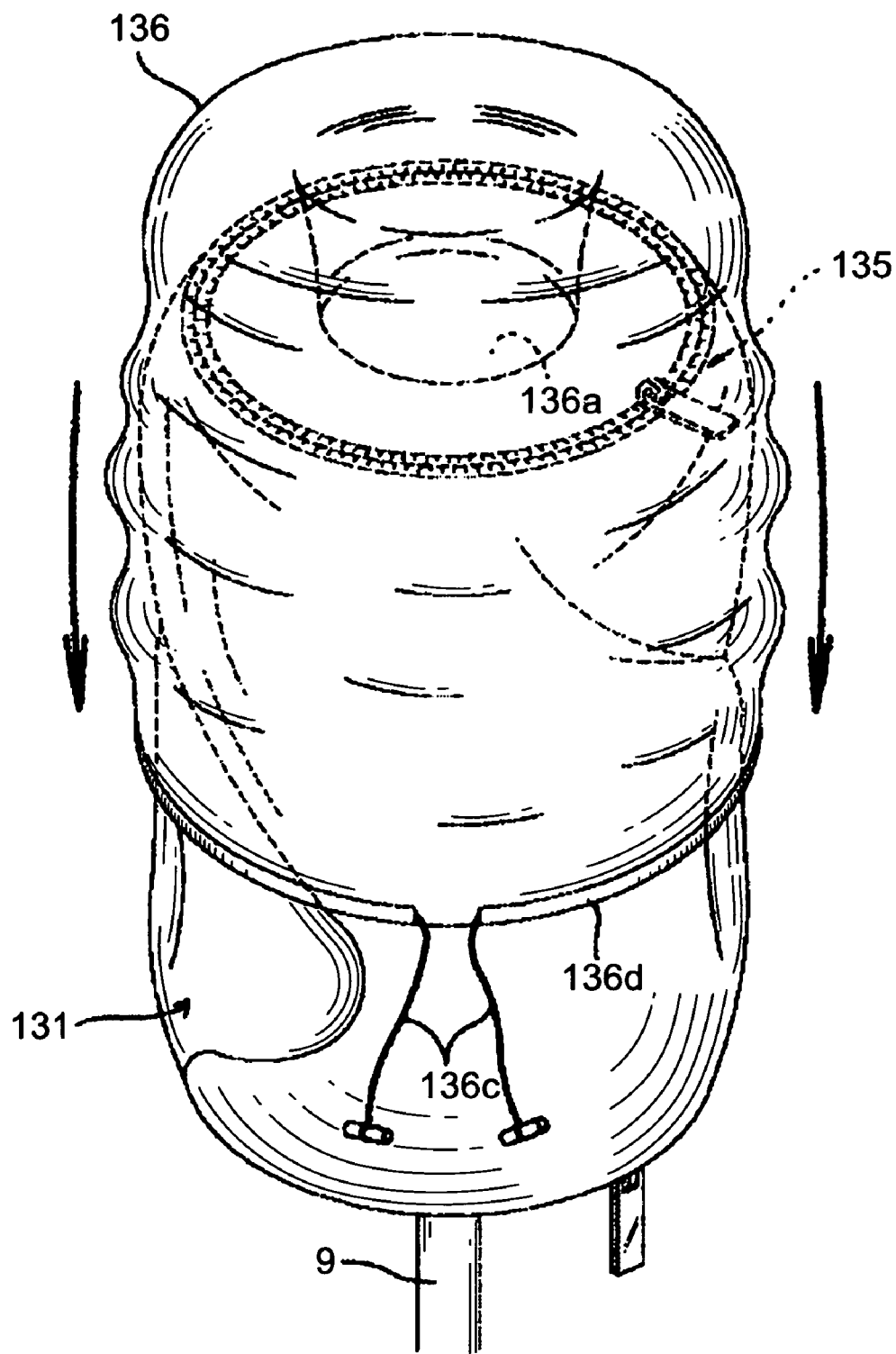
FIG. 25 is a perspective view of a state where the storage bag is put on the contracted balloon.
Figure 26:
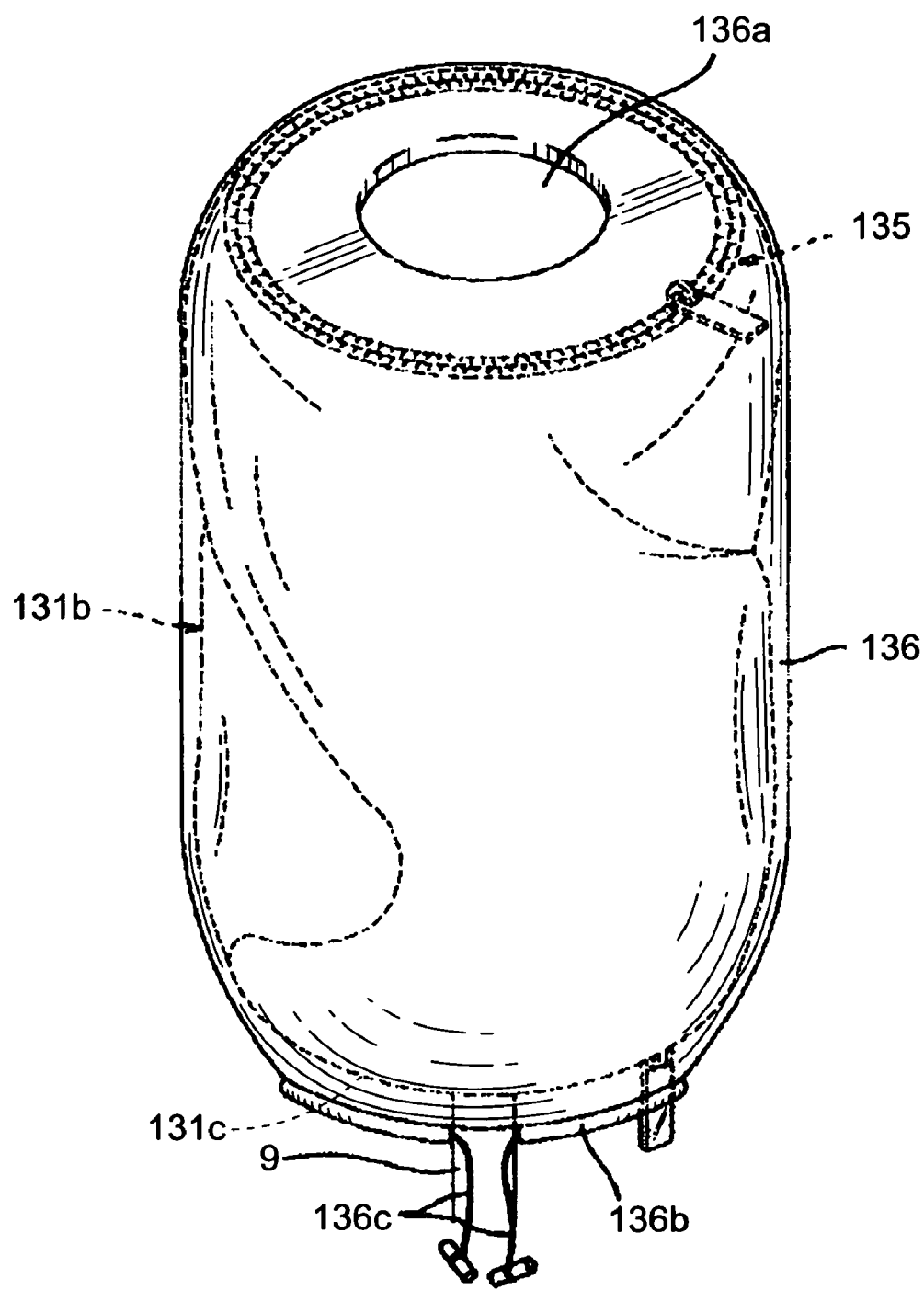
FIG. 26 is a perspective view of a state where the contracted balloon is stored in the storage bag.

A foldable storage bag 136 for storing the contracted balloon 131 and a openable and closeable storage body 137 for storing the storage bag 136 are mounted on the central portion of an external surface of a balloon upper portion 131a. A simple work such as covering the contracted balloon 136 with the storage bag 136 enables the contracted state of the balloon 131 to be held. Besides, when using the balloon 131 inflated (at the time of lighting), by folding up the storage bag 136 and storing the folded bag in the storage body 137, the storage bag 136 is full-time furnished to the balloon 13 (see FIGS. 24 to 26).

In the central portion of the balloon upper portion 131a, the storage body 137 is provided with a peripheral border 137a with an arbitrary height and a cover 137b is installed consecutively with the peripheral border 137a at part of the periphery of the peripheral border 137a. The fastener type engaging means 137c is provided at the peripheral border of the cover 137b and an upper edge of the peripheral border 137a. Then, the cover 137b is joined to the peripheral border 137a in an openable and closeable manner. Further, a storage space of the storage bag 136 folded up is formed between the central portion of the balloon upper portion 131a and the cover 137b with the cover 137b closed.

The peripheral border 137a and the cover 137b is formed from synthesis resin sheet or the like that is possessed of flexibility as well as desired endurance, weather resistance and water resistance and is homogenous or inhomogeneous to that of the balloon 131. The fastener type engaging means 137c is a well-known one where the arrangement of the teeth composed of male and female teeth engages with and disengaged from each other by sliding the opening and closing metal clasp.

The storage bag 136 is a bursiform body with a suitable size and form that is capable of storing the contracted balloon 131 and is formed from a synthesis resin or the like possessed of desired endurance, thermal resistance, weather resistance and water resistance or the like and flexibility. The bottom 136a of the storage bag 136 is attached to an inside of the peripheral border 137a of the storage body by means of sewing or the like. Then, the storage bag 136 is stored in the storage space of the storage body 137 in a folded state, while covering, in an extended state, the contracted balloon 131 to be able to store the balloon 131.

An opening 136b positioned at a lower end of the storage bag 136 is openable and closeable by a tightening means such as a string 136c or the like and by tightening the string 136c with the balloon 131 stored, the stored state of the balloon 131 can be upheld.

A holding frame 133 inside the balloon 131 is, as shown in FIGS. 21, 22, is structured in such a way that an upper plate 138 and lower plate 139 are fixed to the central portion of the balloon upper portion 131a and to the central portion of the balloon lower surface 131c, respectively and a plurality of column members 140 are stood between the upper- and lower plates 138, 139. Each of the column members 140 comprises a small-diameter column 140b inserted into a large-diameter column 140a in a slidable manner and is equipped with a screw member 140c for locking the small-diameter column 140b in a lock releasable manner of sliding of the small-diameter column 140b, thus allowing its length to be adjustable. In other word, by enabling each column member 140 to be adjusted in length, the holding frame 133 can be adjusted in height in accordance with a form and size of the balloon 131.

A lower-support plate 141 is fixed above the lower plate 139 and an air sucking device 134 is mounted between the lower support plate 141 and the lower plate 139

An electric bulb holding plate 142 is mounted below the upper plate 138.

Figure 23:
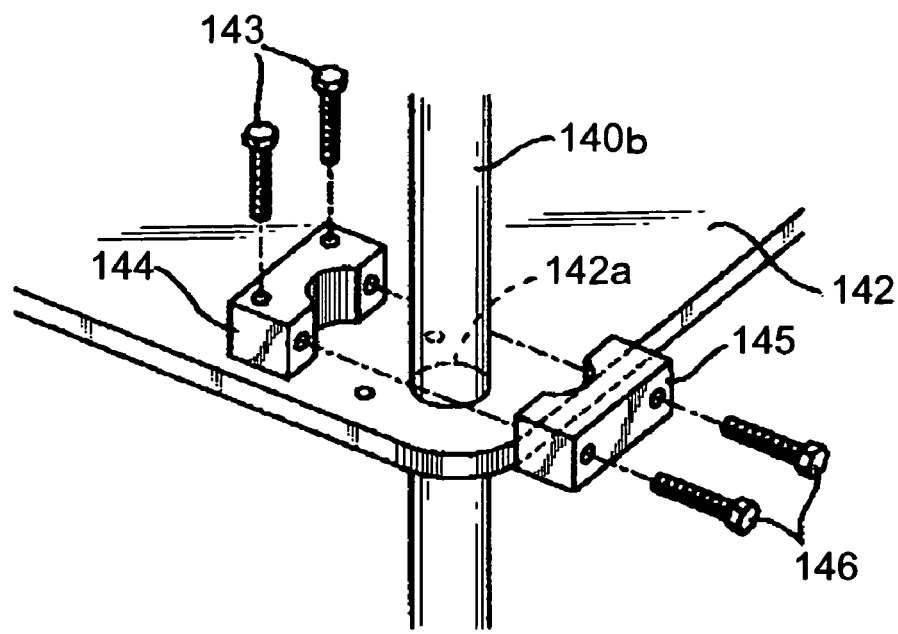
FIG. 23 is an enlarged view of a substantial part in FIG. 22.
Figure 23:
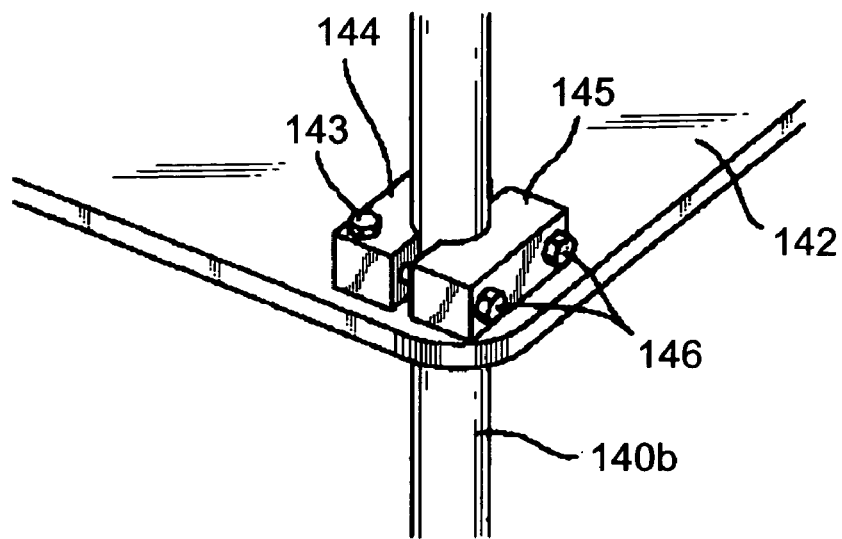

Each column member 140, as shown in FIG. 23, is inserted, in a slidable manner, into a through hole 142a provided at a peripheral border of the electric bulb holding plate 142. A movable block 145 for supporting the column member 140 in a sandwiched manner together with a fixed block 144 is screwed using a screw 146 to the fixed block 144 screwed to the electric bulb holding plate 142 using screws 143. The movable block 145 is fitted to each column member and loosening the screws allows height of the electric bulb holding plate 142 to be arbitrarily set.

A socket not shown is provided downward on the underside of the electric bulb holding plate 142 and the electric bulb 132 is detachably mounted on the socked to be held downward to the underside of the electric bulb holding plate 142. As a result, the electric bulb 132 can be arbitrarily adjusted in height together with the electric bulb holding plate 142.

In the meantime, not shown, two electric bulbs may be mounted by providing two sockets on the underside of the electric bulb holding plate 142 and further an electric bulb holding plate may be provided also above a lower support plate 141 to mount the electric bulb on the upper or the lower surface of the lower support plate 141 and so on. Thus, appropriate modifications are possible in accordance with the number of the electric bulbs.

As shown in FIG. 22, a mounting frame 146 equipped with a color filter colored 147 with an arbitrary color is detachably mounted at a periphery of the holding frame 133.

The mounting frame 146 is formed as follows: wires 148, 149 are framed vertically and horizontally that are made of a metal and a synthetic resin that are possessed of desired rigidity, elasticity, thermal resistance or the like and then the color filter 147 with thermal resistance and optical transparency covers a space surrounded by each wires 148, 149; both ends of horizontal wires 149 are bent inward in an elastically engageable and disengageable manner with the column member 140 to be made into a catching portion 150 and are formed detachably to the holding frame 133.

Then, a plurality of the mounting frame 146 to which color filters 147 of various colors are adhered are prepared and the mounting frame 146 with an arbitrary color is chosen to be mounted on the periphery of the holding frame 133. Thus, a projector 1 can be obtained that irradiates light of an arbitrary color.

Additionally, not shown, instead of the color filter 147, a mounting frame is formed that is equipped with a shield filter for shielding irradiated light from the electric bulb to be mounted on an arbitrary position at the periphery of the holding frame 133. Thus, an irradiating direction of light of the projector 1 can be limited only to an arbitrary direction.

And now, a balloon form 131 described above is not limited to that shown in the drawings and various forms including nearly a horizontally long drum-like one, a nearly circular-truncated-cone one, an inverted circular-truncated-cone one and a doll, an animal, a building, a character, or the like may be used. Further, not shown, inside the balloon 131, there is provided a reflection filter for reflecting irradiating light from the electric bulb 132. As a result, even if there exist parts light is hard to reach in a balloon 131 of a doll form, the light of the doll can get pervasive effectively over the whole of the balloon 131 by the reflection filter, so that the whole of the balloon 131 can be light.

In that case, if a plurality of the various forms is prepared as the intermediary portion 131b of the balloon 131, an arbitrary intermediary portion is selected to be able to be easily exchanged with operation of a fastener type joining means 135 for an upper portion 131a and a lower portion 131c.

When opening the balloon 131 with the operation of the fastener type joining means 135, replacement of the electric bulb 132 and supporting frame 133, and height adjustment operation of the electric bulb holding plate 142 can be easily practiced.

As substitute for the fastener type joining means 135 and the fastener type engaging means 137c, various types of engaging means such as a hock, a hook, a button or the like are available in which a male member and a female member engages detachably with each other.

Further, by mounting a mounting frame 146 equipped with an arbitrary color filter 147 so as to surround the holding frame 133, light with an arbitrary color can be irradiated.

Furthermore, by mounting the holding frame 133 equipped with the shield filter on an arbitrary position, a floodlighting range can be arbitrarily set for an outside entire circumferential direction of the balloon 131.

In the meantime, in this floodlighting state, the storage bag 136 is folded up to be stored in the storage body 137 and the cover 137b of the storage body 137 is in a closed sate (see FIG. 21).

Figure 24:
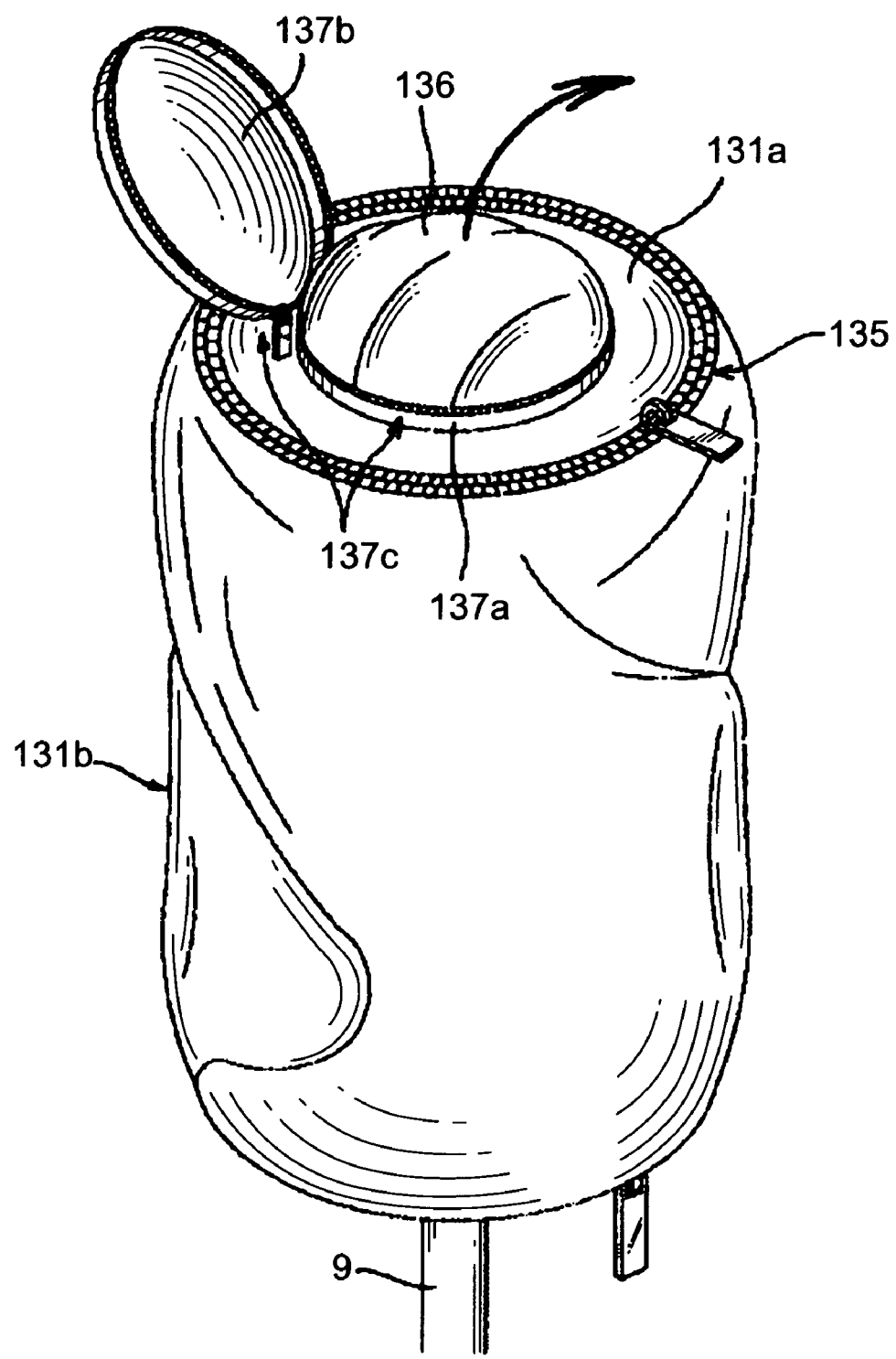
FIG. 24 is a perspective view of a state where a balloon is contracted and a storage bag is taken out.

After completion of the floodlighting operation, the light of the electric bulb 132 is turned off and then after an air sucking device 134 is allowed to stop operating to contract the balloon 131 and then the cover 137b is opened to take out the storage bag 136 (see FIG. 24). Then, by covering the balloon 131 contracted with the storage bag 136 (see FIG. 25) from above, when an opening 136b has came down to a level of the lower portion 131c of the balloon 131 (in a state where the balloon 131 contracted bas been stored in the storage bag 136), a string 136c is tied to bind the opening 136b, holding a stored state (see FIG. 26) of the balloon 131, so that the projector can be conveyed and stored in this state.

As the present invention is schemed as described above, the advantages of the first embodiment can be obtained and besides the advantages can be also achieved as descried below.

Through simple work of only covering the contracted balloon 131 with the storage bag 136, the balloon 131 can be conveyed and stored with the contracted state of the balloon 131 kept. Besides, when having inflated the balloon 131, the storage bag 136 is folded up to be stored in the storage body and thus becomes furnished always to the balloon 131, so that many advantages are brought about, e.g., an advantage that there is no likelihood that the storage bag is lost and so on.

Further, the storage bag 136 and the storage body 137 are mounted on the central portion of the balloon upper portion 131a. Hence, in use of the balloon 131 (in a lighted state), there is no possibility that the storage bag 136 and the storage body 137 intercept the irradiating light and besides workability is improved at the time of covering the balloon 131 contracted with the storage bag 136.

The holding frame 133 can be arbitrarily adjusted in height in accordance with the form and size of the balloon 131 and besides the electric bulb 132 can be arbitrarily adjusted in height. Hence, various types of the balloons 131 different in form and size can be arbitrarily selected and replaced to be mounted on the lighting system 2.

The balloon 131 is divided into three portions, the upper portion 131a, the intermediary portion 131b and the lower-surface potion 131c and besides the upper portion 131a, the intermediary portion 131b and the lower-surface potion 131c are detachably joined together by a engageable and disengageable means 135. Hence, when damages occur in the intermediary potion 131b by its use over long periods, exchanging work or the like can be simply performed.

The color filter 147 can be detachably mounted on the periphery of the holding frame 133. Hence, by selecting an arbitrary color filter from among a plurality of the color filters 147 prepared to mount, the projector 1 can be obtained which can irradiate light with an arbitrary color.

A usual projector 1 equipped with a lighting system 2 that brings about each of the effects described above or a projector 1 that is simplified in assembly and disassembly can be provided.

Embodiment 5

A projector 1 according to a fifth present embodiment is described with reference to the accompanying drawings. In the fifth embodiment, descriptions on parts the same as in the first embodiment are hereunder omitted to avoid overlapping.

Figure 27:
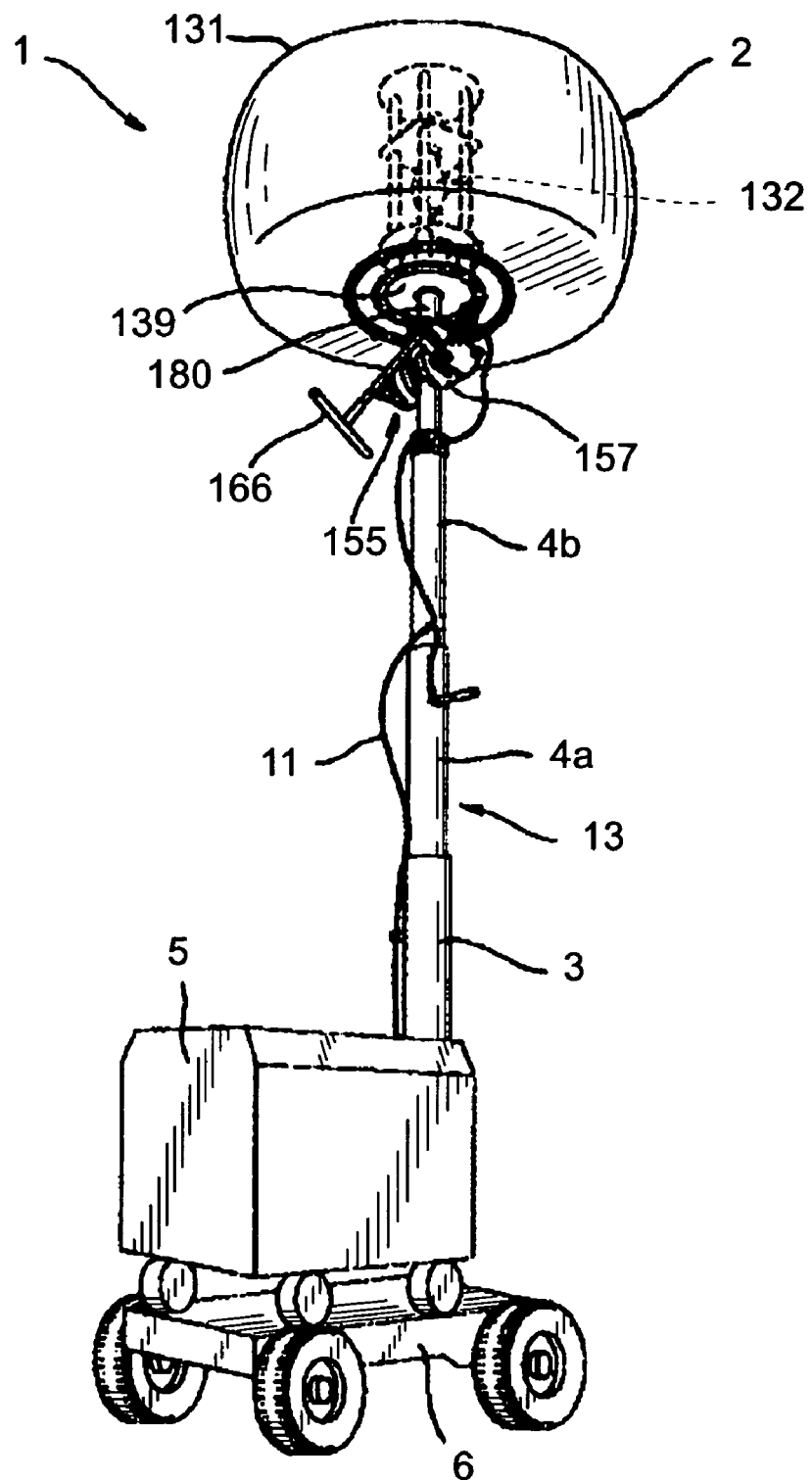
FIG. 27 is a perspective view illustrating one example of the projector in a fifth embodiment of the present invention and illustrating its busy condition.
Figure 28:
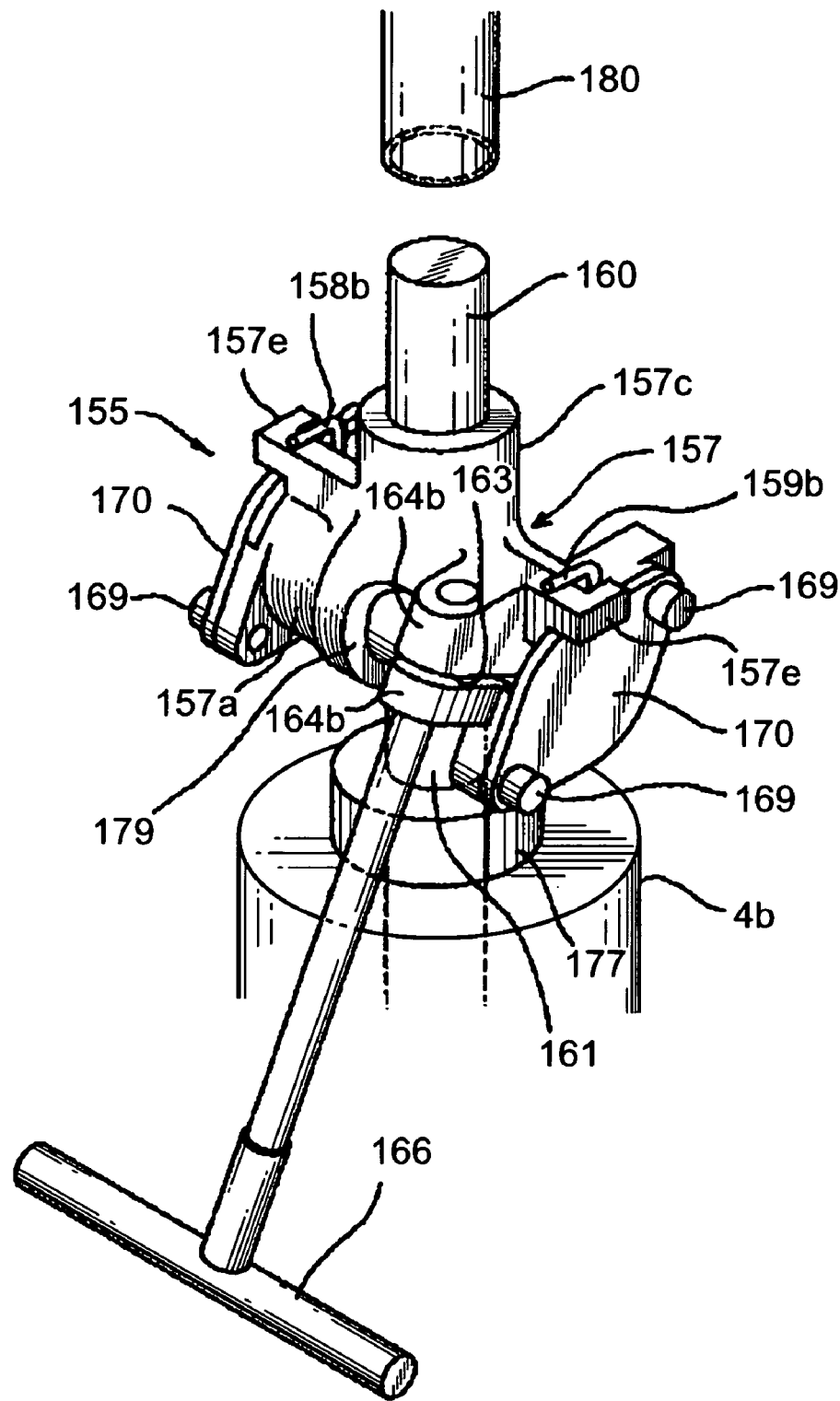
FIG. 28 is an enlarged perspective view of an angle adjustment unit of the projector shown in FIG. 27.

In FIG. 27, an angle adjustment unit 155 is mounted on an upper end of the uppermost third support column 4b and a lighting system 2 is detachably mounted on the angle adjustment unit 155.

Figure 29:
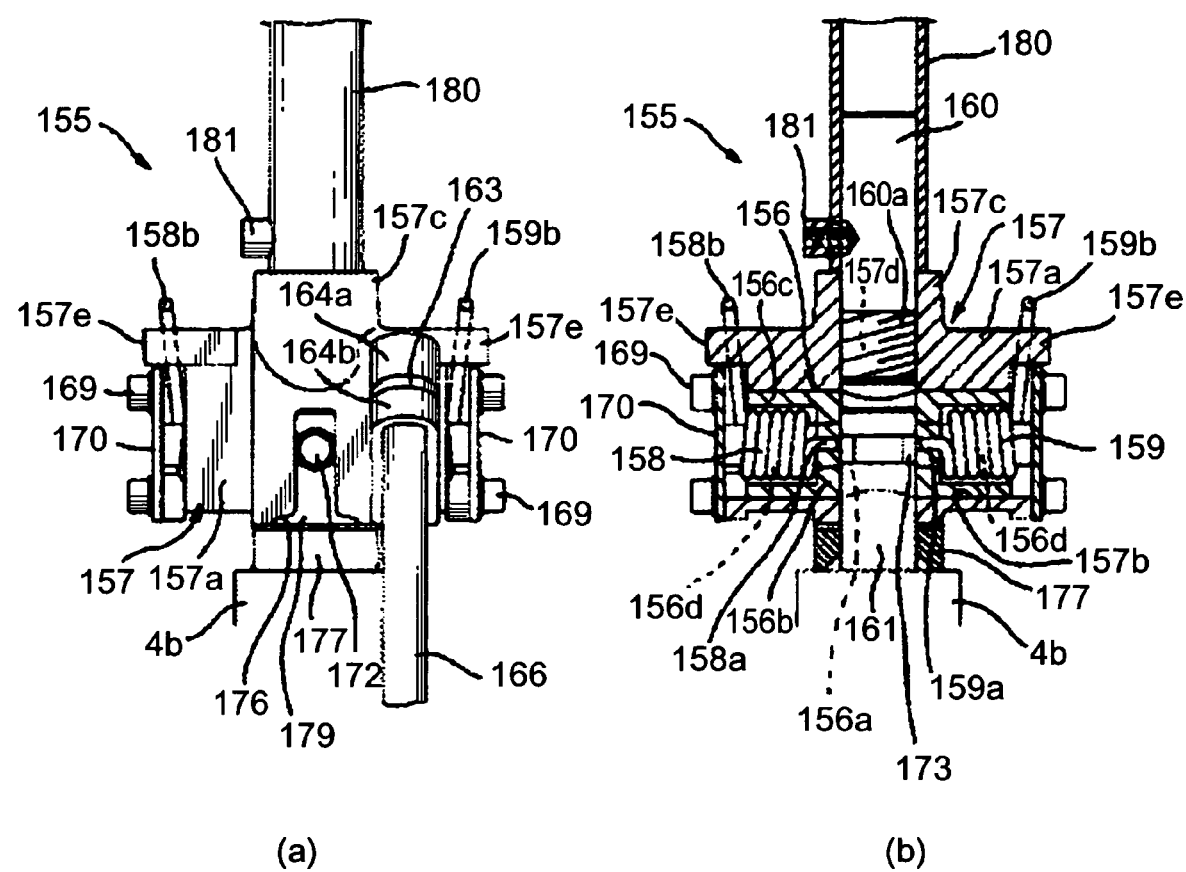
FIG. 29(a) is a front view of the angle adjustment unit in FIG. 27.
FIG. 29(b) is a longitudinal sectional front view of the angle adjustment unit in FIG. 27.
Figure 30:
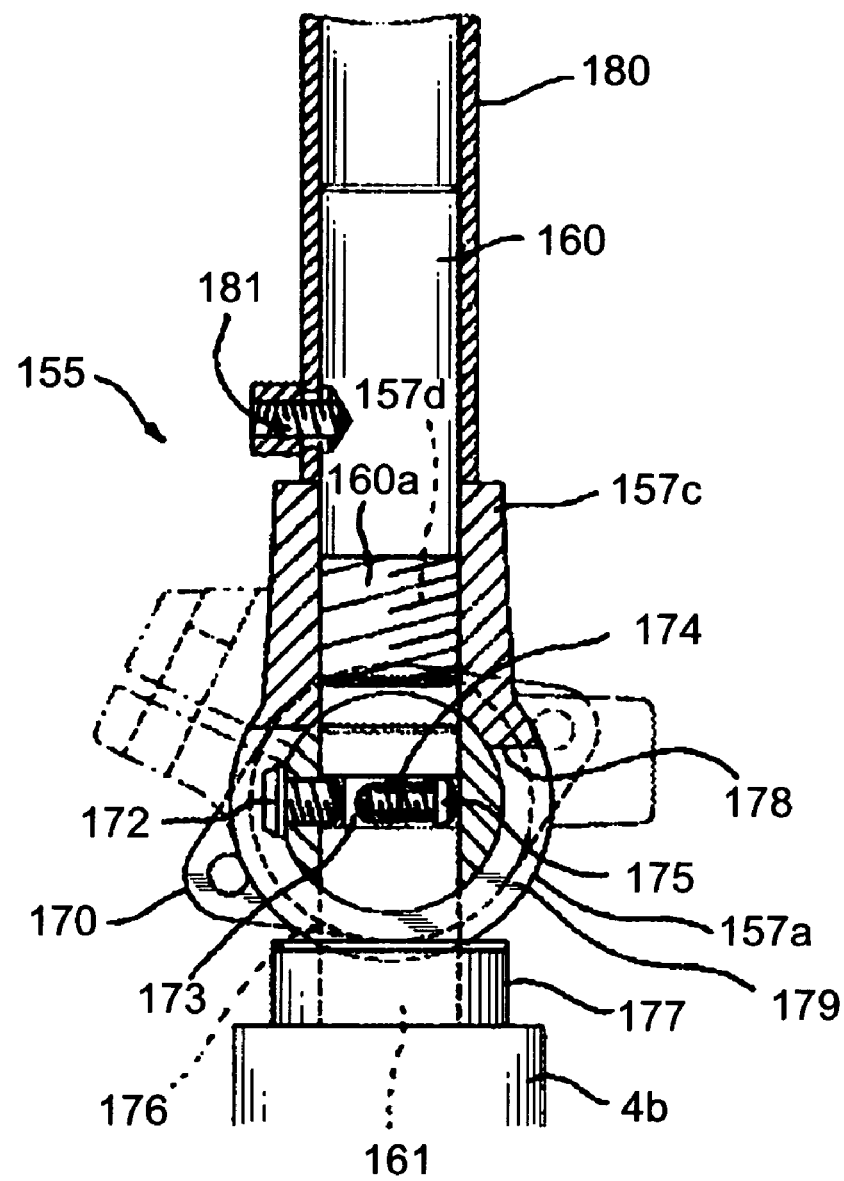
FIG. 30 is a longitudinal sectional side view of the angle adjustment unit in FIG. 29.
Figure 31:
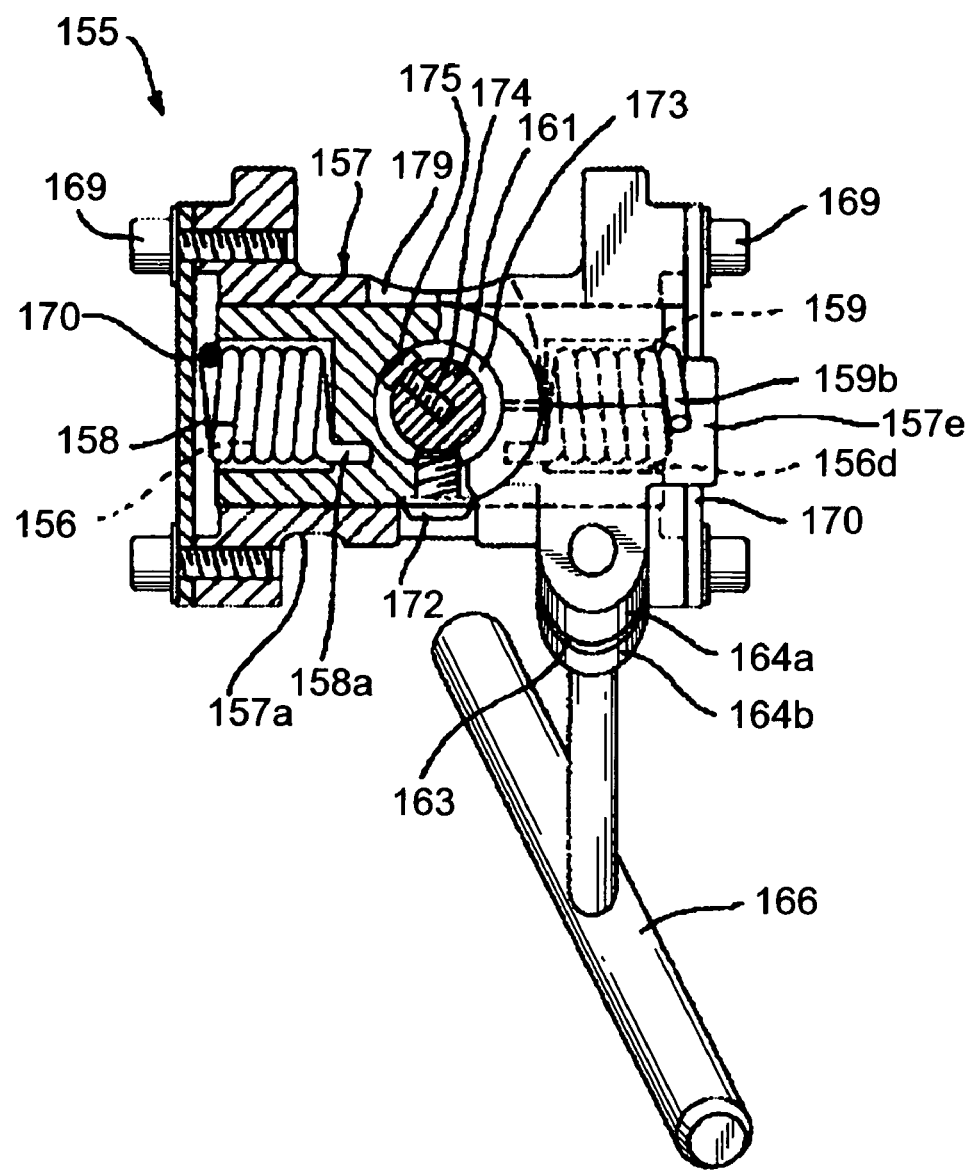
FIG. 31 is a traverse sectional pain view of the angle adjustment unit in FIG. 29.
Figure 32:
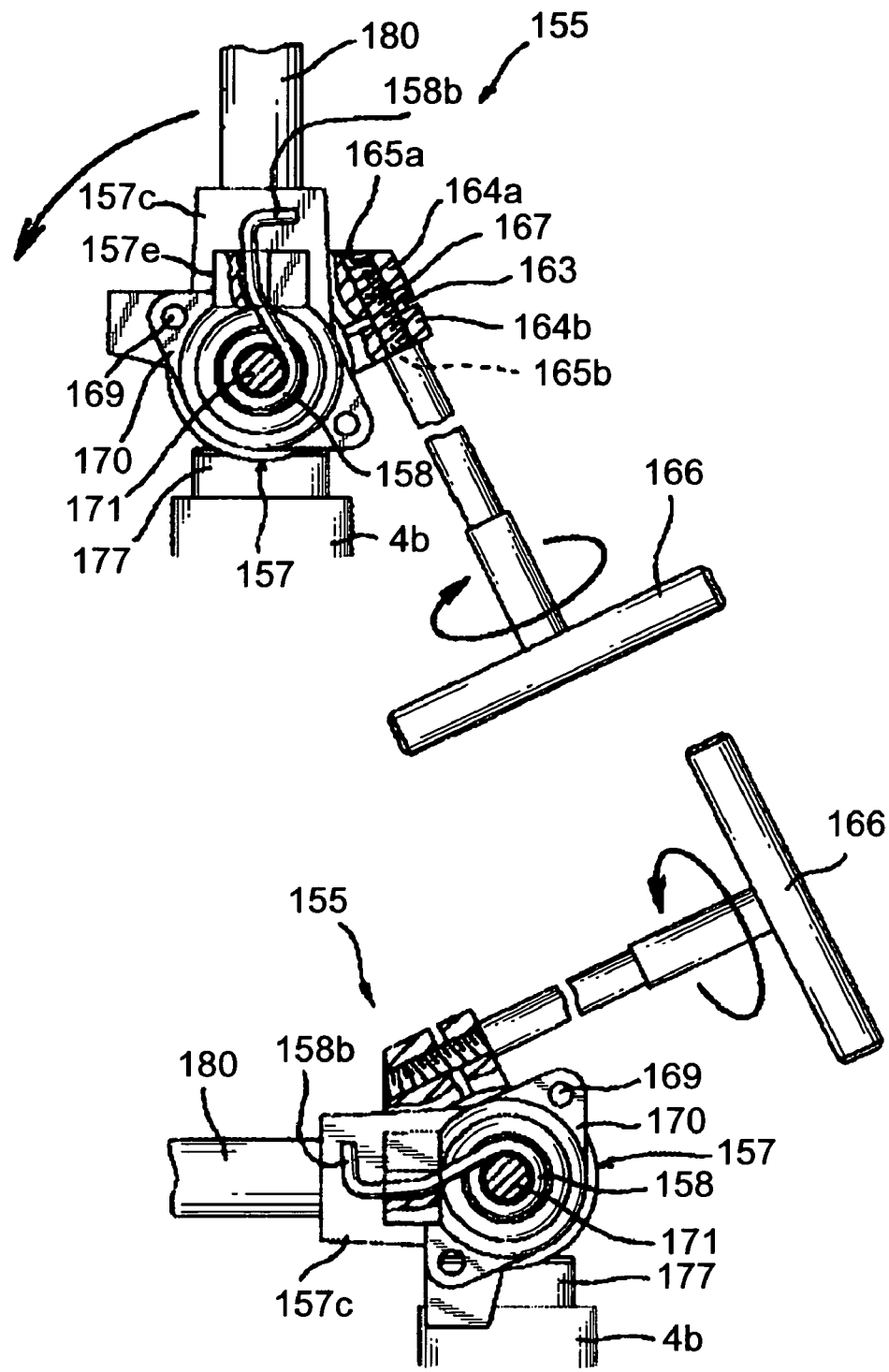
FIG. 32(*a*) is a partially cutaway side view illustrating a backward and forward rotating state of the angle adjustment unit and especially illustrating a nearly vertically upstanding state in FIG. 29.
Figure 33:
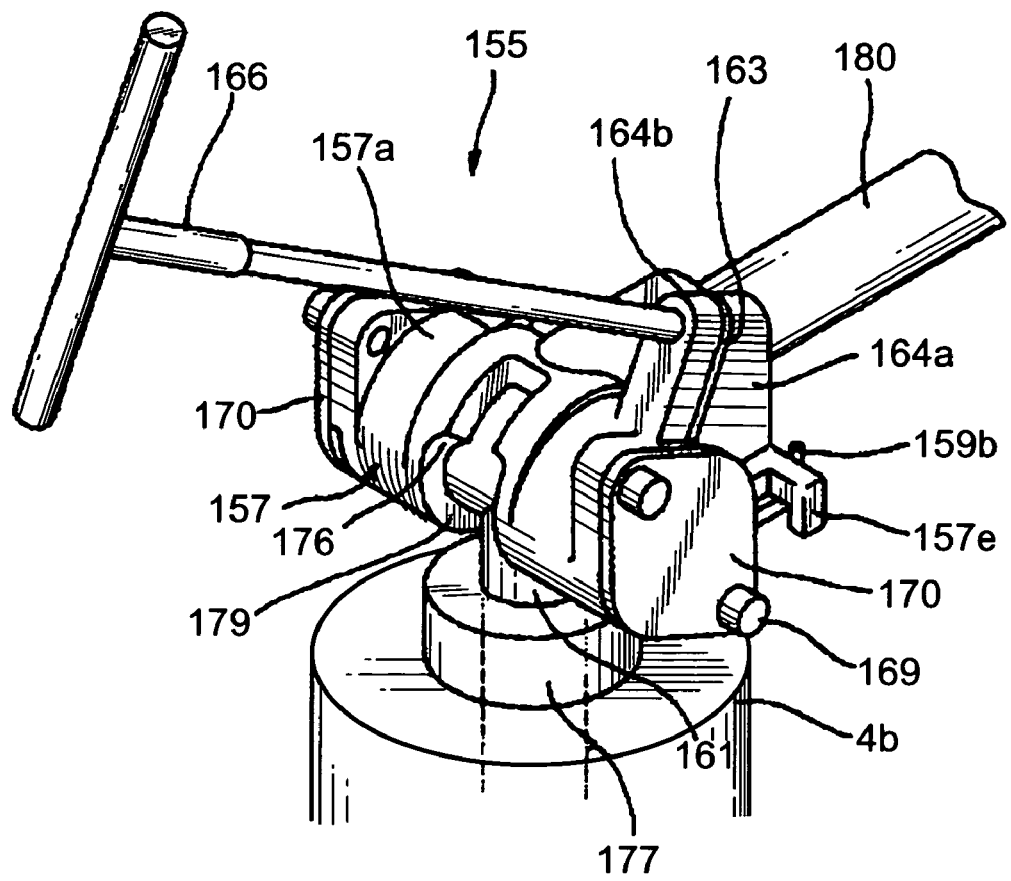
FIG. 33 is a perspective view illustrating a backward and forward rotating state of the angle adjustment unit in FIG. 29.
Figure 34:
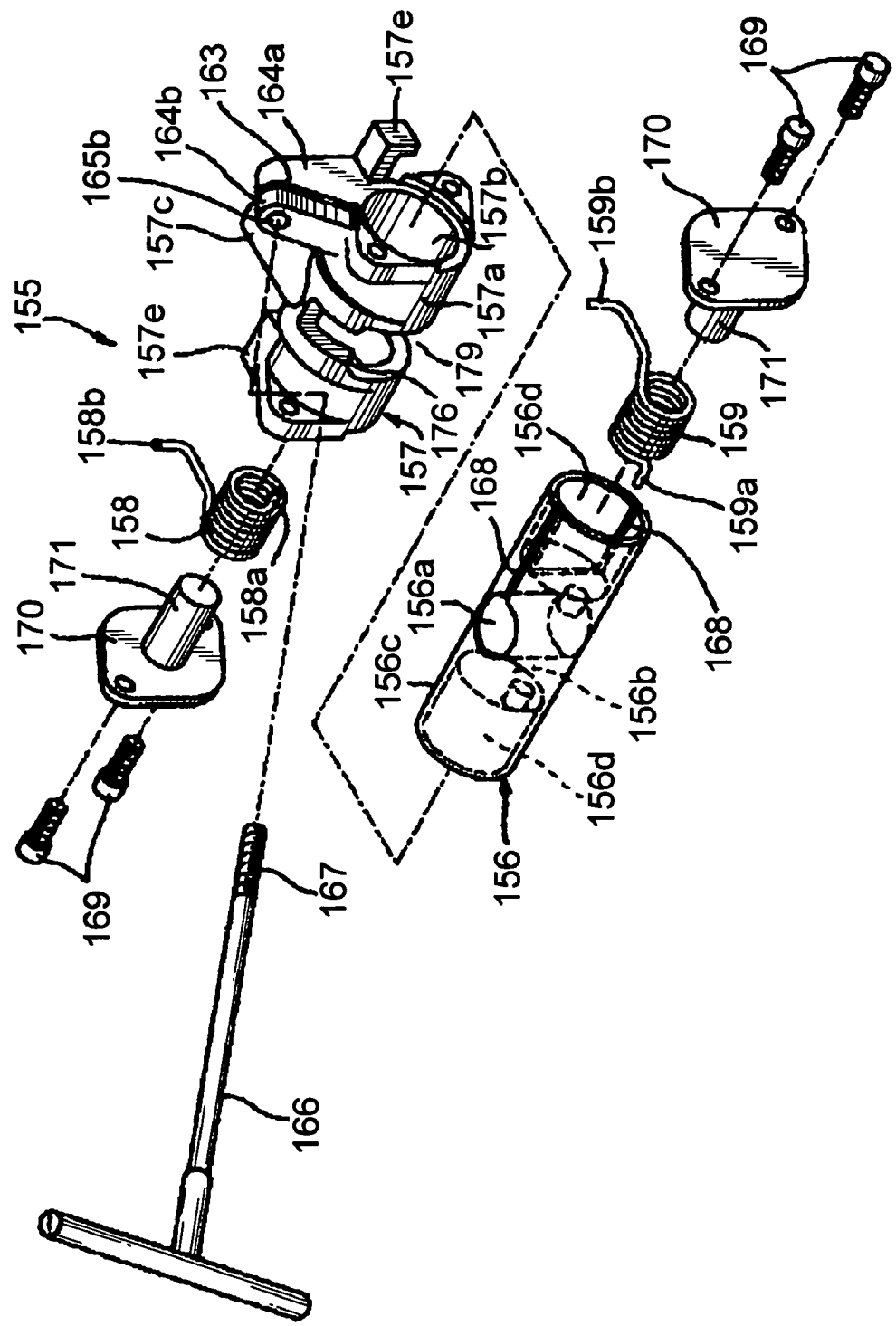
FIG. 34 is an exploded perspective view of the angle adjustment unit of FIG. 29.

As shown in FIGS. 28 to 34, the angle adjustment unit 155 comprises a first spindle 156 (FIG. 29(b)) that is fixed to the support column 13 and acts as the rotating center in a backward and forward direction, a tubular member 157 (FIG. 28) that is inserted externally by the first spindle 156 in a rotatable manner and is supported in a rotatable manner in a backward and forward direction, a front-side spring (a front-side biasing member) 158 (FIG. 29(b)) for energizing rotating motion toward a front of the tubular member 157, a rear-side spring (a rear-side biasing member) 159 for energizing rotating motion toward a backside of the tubular member 157, a connecting shaft (a connecting member) 160 (FIG. 28) for connecting the tubular member 157 and the lighting system 2, and a second spindle 161 (FIG. 28) for supporting the first spindle 156 that is installed on an upper end of the uppermost third support column 4b in a protruding manner and supports the first spindle 156 and a tubular member 157 in a horizontally rotatable manner.

The first spindle 156 is equipped with, at the central portion in a length direction of a spindle body formed into a nearly cylindrical form, a spindle hole 156a into which a second spindle 161 is inserted in a rotatable manner and the first spindle 156 is supported by the second spindle 161 in a rotatable manner in a horizontal direction.

Further, the first spindle 156 includes left and right partition walls 156b, 156b installed internally in such a manner as to sandwich the spindle hole 156a, depressed portions 156d, 156d partitioned by the partition wall 156b and a peripheral wall 156c on both left and right sides thereof. The front- and rear-side biasing members 158, 159 are mounted inside these depressed potions 156d.

The tubular member 157 is equipped with, on the underside of a main body 157a inserted into an outside of the spindle hole 156 in a rotatable manner, a spindle hole 157b into which a second spindle 161 is inserted. The tubular member 157 is supported in such a manner as to turn in a backward and forward direction by the first spindle 156 to turn in a horizontal direction integrally with the first spindle 156. On an upper surface of the main body 157a, a mounting hole 157d surrounded by a raised ridge 157c is formed coaxially with the spindle holes 156a, 157b, while a lower end portion of the connecting shaft 160 for connecting the tubular member 157 and the lighting system 2 is fixed to the mounting hole 157d by a connecting means such as screwing or the like.

A slit 163 along an axial direction is formed on a circumferential wall of the main body 157a. An inner diameter of the slit 163 is reducible and inflatable. Upper and lower protrusions 164a, 164b are provided along an upper edge and lower edge of the slit 163 and further threaded screw holes 165a, 165b are formed coaxially with each other in the protrusions 164a, 164b.

A threaded portion 167 (FIG. 32) provided at a proximal end of an operation portion 166 is screwed into these threaded screw holes 165a, 165b. A rotating operation of the operation bar 166 toward a positive direction allows the protrusions 164a, 164b to approximate each other, reducing an inner diameter of the main body 157a, while an inversely rotating operation estranges the protrusions 164a, 164b from each other to enlarge an inner diameter of the main body 157a.

Slits 168 along the axial direction of the first spindle 156 are formed also in a peripheral wall of the first spindle 156 and an inner diameter of the peripheral wall can be reduced or enlarged.

Then, when performing the rotating operation of the operating portion 166 toward the positive direction, the inner diameter of the main body 157a is decreased, so that friction resistance is increased between the first spindle 156 and the main body 157a, thus limiting a posterior-anterior rotating motion of the tubular member 157. Besides, the inner diameter of the first spindle 156 is decreased to deform the spindle hole 156a, so that the friction resistance is increased between the second spindle 161 and the spindle hole 156a, thus limiting the rotating motion of the first spindle 156 (of the tubular member 157) toward the horizontal direction.

On the other hand, when performing the rotating operation of the operating arm 166 toward the reverse direction, the inner diameter of the main body 157a is increased, so that the friction resistance is decreased between the first spindle 156 and the main body 157a, thus enabling a free r rotating motion of the tubular member 157 toward the posterior-anterior direction. Besides, the inner diameter of the first spindle 156 is increased, thus enabling the free rotating motion of the first spindle 156 (of the tubular member 157) toward the horizontal direction.

The front- and rear-side biasing members 158, 159 are helical springs with predetermined elastic force and are wound around a shaft 171 (FIG. 32) protruding to a backside of a cover 170 screwed using a screw 169 to the tubular member 157 so as to close the depressed portion 156d. One ends 158a, 159a of the biasing members 158, 159 are locked to the first spindle 156, while the other ends 158a, 159b thereof are locked to an engaging wall 157e of the tubular member 157, so that the biasing members 158, 159 are housed in the depressed portions 156d at both the left and right sides of the first spindle 156.

The front- and rear-side biasing members 158, 159 are nearly equivalent in biasing force (elastic force). The front-side biasing member 158 biases forward rotating motion of the tubular member 157, while the rear-side biasing member 159 biases backward rotating motion of the tubular member 157. These biasing forces are made approximately equivalent, thus mitigating the posterior-anterior rotating motion of the tubular member 157 (of the lighting system 2).

Around the second spindle 161, there is provided an engaging groove 173 with which a distal end of a bolt 172 screwed to the first spindle 156 engages to prevent the first spindle 156 from disengaging. A loose preventing screw 174 is screwed to the engaging groove 173. Then, a rotating motion range of the first spindle 156 and tubular member 157 (of the lighting system 2) toward the horizontal direction is arbitrarily limited by engagement of a screw head 175 protruding to an inside of the engaging groove 173 with a distal end of the bolt 172

Figure 35:
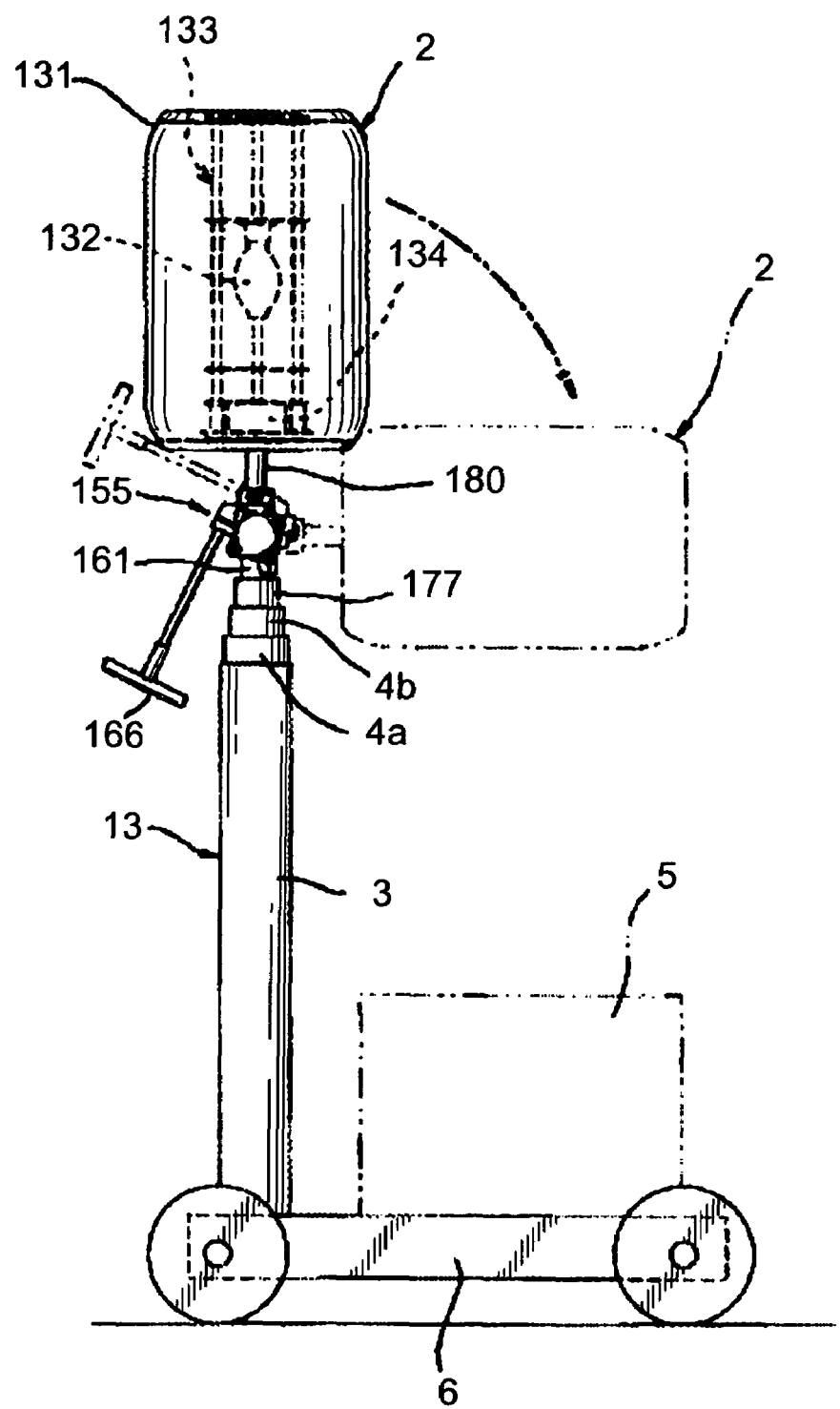
FIG. 35 is a side view illustrating a housed state of the projector shown in FIG. 27.

Further, in a peripheral wall of the main body 157a of the tubular member 157, a groove 179 is formed across a surface 176 (FIG. 29) and a surface 178 (FIG. 35). The surface 176 engages with the second spindle 161 to limit a range of a posterior-anterior rotating motion of the tubular member 157 to a position where the connecting shaft 160 rises nearly perpendicularly, while the surface 178 engages with a collar 177 fitted into a lower end of the second spindle 161 to limit a range (a range of about 90 degrees) of a position where the connecting shaft 160 has gone nearly horizontally.

The connecting shaft 160 is mounted on the tubular member 157 by screwing the threaded portion 160a provided at the lower end of the connecting shaft into the mounting hole 157d, while the upper end of the connecting shaft 160 is inserted externally by a tubular portion 180 fixed to an undersurface plate 157 (FIG. 27) of the holding frame 133 of the lighting system 2 to be fixed with a screw 181. Thus, the connecting shaft 160 connects the tubular member 157 and the lighting system 2 with each other.

In the projector 1 thus structured in the present embodiment, the support column 13 is extended to place the lighting system 2 at an arbitrary height, the balloon 131 is inflated by operation of the electric power supply 5 to light the electric bulb 132 and further the light of the bulb is allowed to pass through the balloon 131 to be converted into soft light, so that the illumination is possible in an outside entire circumference of the balloon 131. Hence, no glare is sensed and light can be irradiated over a wide range (see FIG. 27).

Further, in cases where a floodlighting range is limited by attaching the light shield sheet to the periphery of the balloon 131, floodlighting directions and angles can be arbitrary adjusted by the angle adjustment unit 155.

Namely, by increasing the inner diameters of the main body 157a of the tubular member 157 and first spindle 156 of the tubular member 157 through the operation of the operating portion 166, the tubular member 157 is allowed to freely turn back and forth and leftward and rightward. The lighting system 2 is positioned at an arbitrary angle and thereafter by decreasing the inner diameters of the main body 157a of the tubular member 157 and first spindle 156 through the operation of the operating portion 166, the tubular member 157 is limited (locked) in freely back and forth and leftward and rightward rotating motion. Hence, the floodlighting directions and angles can be arbitrarily set (see FIG. 32, FIG. 33).

When changing a lighting position at a construction site or the like, the electric power unit 5, the support column 13 and the lighting system 2 can be moved together by the carrier 6. Hence, the projector can be placed at arbitrary positions as well as being easy to handle.

After the floodlighting operation has completed, the support column 13 is retracted and besides the electric power unit 5 is stopped to contract the balloon 131. Then, the light of the electric bulb 132 is turned off and further the connecting shaft 160 is laid down by 90 degrees by the angle adjustment unit 155. As a result, the projector can be conveyed and stored with the lighting system 2 compactly positioned on the upper position of the electric power unit 5 mounted on the carrier 6 (FIG. 35).

In the angle adjustment operation described above, even if the lighting system 2 were to begin abruptly rotating back and forth by its own weight, a buffering action against the back and forth rotating motion would operate by front- and rear-side biasing members 158, 159 to ensure safety operation.

In the meantime, in the projector 1 according to the present invention, the type of the lighting system 2 is not limited to the balloon type shown in the drawings. A spot type lighting system for irradiating light of the electric bulb forward by a reflector may be used and the number of the electric bulbs may be optional. Further, the form of the balloon in the balloon type lighting system is not limited to that shown in the drawings and so the various forms may be used including a nearly horizontally long drum one, a nearly truncated conical one, an inverse truncated conical one and a doll, an animal, a building and a character or the like.

As the present invention provides the structure described above, the above-mentioned effects of the first embodiment can be attained and besides another effects can be also attained as described below.

Even if the lighting system 2 is much heavy, the buffering action operates against the posterior-anterior rotating motion by the front-and rear side biasing members 158, 159, so that the lighting system 2 can be prevented from abruptly rotating by its own weight, thus enabling safety operation.

In addition to the effects described above, by supporting the tubular member 157 in a horizontally rotating manner, the lighting system 2 is allowed to freely turn horizontally to be able to adjust the floodlighting directions and angles more widely.

In addition to the effects described above, the electric power unit 5, the support column 13 and the lighting system 2 can be moved together by the carrier 6. Hence, such effects can be obtained as being able to place at arbitrary positions as well as being easy to handle.

In addition to the effects described above, after lighting the electric bulb 132, the light of the electric bulb 132 is allowed to pass through the balloon 131 to be converted into soft light, so that the illumination is possible in an entire outside circumference of the balloon 131. Hence, no glare is sensed and light can be irradiated over a wide range.

The present invention is not limited to the present embodiment and various modifications are possible within the scope of the gist of the invention. The biasing means, e.g., is not limited to the gas damper and an oil damper and a coil spring may be arbitrarily employed. Further, the telescopic support column is described as that comprising three and four support columns in the present embodiment. According to the applications, however, the number of the support columns may be increased. Further, the biasing force by the gas damper may be increased and thus the support column may be extended even if an operator exerts no force on the support column.

The invention claimed is:

1. A projector comprising:
a telescopic support column installed on a base,
a lifting and lowering device provided inside said support column,
a lighting system provided on a distal end of said support column, and
a power supply unit for supplying power to said lighting system, wherein said support column is constituted by loosely fitting a base support column fixed to a base to an upper support column comprising a plurality of support columns whose outer diameters are made smaller in ascending order relative to said base support column, said plurality of support columns constituting said upper support column are loosely and sequentially fitted into each other in a vertically movable manner and in a rotatable manner in conjunction with one another, and wherein said upper support column comprises second and third support columns,
said lifting and lowering device is equipped with a biasing means that is fitted loosely into an inside of said second support column in a vertically movable manner and biases said support column in its extending direction,
a lower end of said biasing means is fixed to an inner bottom of said base support column together with an inner race of a bearing provided thereabove,
a pulley is provided on an upper end of said biasing means, and
a wire is wound around said pulley, one end of said wire being fixed to a receiving portion provided on an outer race of said bearing, while the other end of said wire being fixed to a lower portion of said third support column.

2. A projector comprising,
a telescopic support column installed on a base,
a lifting and lowering device provided inside said support column,
a lighting system provided on a distal end of said support column, and
a power supply unit for supplying power to said lighting system, wherein said support column is constituted by loosely fitting a base support column fixed to a base to an upper support column comprising a plurality of support columns whose outer diameters are made smaller in ascending order relative to said base support column, said plurality of support columns constituting said upper support column are loosely and sequentially fitted into each other in a vertically movable manner and in a rotatable manner in conjunction with one another, and wherein
said upper support column comprises second, third and fourth support columns,
an internal support column is provided inside said third support column, said internal support column being loosely fitted into said fourth support column in a vertically movable manner,
said lifting and lowering device is equipped with a biasing means that is loosely and vertically moveably fitted into said second support column and biases said support column toward its extending direction,
a lower end of said biasing means is fixed to an inner bottom of said base support column together with an inner race of a bearing provided thereabove,
a first pulley is provided on an upper end of said biasing means,
a first wire is wound around said first pulley, one end of said first wire being fixed to a receiving portion provided on an outer race of said bearing, while the other end of said first wire being fixed to a lower portion of said third support column,
a second pulley is provided on an upper portion of said internal support column,
a second wire is wound around said second pulley, one end of said second wire being fixed to a lower portion of said second support column, while the other end of said second wire being fixed to a lower portion of said fourth support column.

3. The projector according to claim 1, further comprising a through-hole provided on a bottom of said upper support column, in order for said wire to pass therethrough.

4. The projector according to claim 1, further comprising an outrigger device equipped with: protruding rods extending radially from said base; a spindle for rotatably supporting proximal ends of said protruding rods from protruded positions where said protruding rods are extended out radially toward a vertically upward direction above said base; and a lock mechanism for fixing said protruding rods at said protruded positions.

5. The projector according to claim 4, wherein said spindle comprises a bolt and a nut, and a bolt fixing member for fixing said bolt, so that when rotating said protruding rod from said protruded position to a base side, said spindle tightens the proximal end of said protruding rod to hold said protruding rod vertically.

6. The projector according to claim 1, further comprising:
a support column drop preventing mechanism equipped with:
movable pulleys supported in a manner vertically slightly movable and lockable together with rotating shafts;
a locking claw that turns in conjunction with vertical movement of said movable pulleys; and
engaging portions provided on a peripheral wall of said upper support column, said engaging portions allowing said locking claw to engage therewith.

7. The projector according to claim 1, wherein said lighting system is equipped with a balloon, an electric bulb, a holding frame for holding said electric bulb and a balloon inflating means for inflating said balloon, while a foldable storage bag for storing a contracted balloon and a openable and closeable storage body for storing said storage bag are mounted on a periphery of said balloon.

8. The projector according to claim 7, wherein said storage bag and said storage body are mounted on a central portion of an upper surface of said balloon.

9. The projector according to claim 7, wherein said holding frame comprises an upper plate fixed to the central portion of the upper surface of said balloon, a lower plate fixed to a central portion of a lower surface of said balloon, and a plurality of telescopic support columns erected between said upper plate and said lower plate.

10. The projector according to claim 7, wherein said balloon comprises an upper portion, an intermediate portion and a lower portion so that said upper portion, said lower portion and said intermediate portion are detachably joined to one another by an engaging means that is engageable and disengageable.

11. The projector according to claim 7, wherein a color filter colored with an arbitrary color is detachably mounted on a periphery of said holding frame.

12. The projector according to claim 1, further comprising an angle adjustment unit mounted on an upper end of said support column, said angle adjustment unit comprising a first spindle for supporting said lighting system in a manner capable of rotating back and forth; and a biasing member for biasing a rotating motion of said lighting system.

13. The projector according to claim 12, wherein said angle adjustment unit is equipped with a second spindle for supporting said angle adjustment unit in a manner capable of rotating in a horizontal direction.

14. The projector according to claim 3, further comprising an outrigger device equipped with: protruding rods extending radially from said base; a spindle for rotatably supporting proximal ends of said protruding rods from protruded positions where said protruding rods are extended out radially toward a vertically upward direction above said base; and a lock mechanism for fixing said protruding rods at said protruded positions.

15. The projector according to claim 14, wherein said spindle comprises a bolt and a nut, and a bolt fixing member for fixing said bolt, so that when rotating said protruding rod from said protruded position to a base side, said spindle tightens the proximal end of said protruding rod to hold said protruding rod vertically.

16. The projector according to claim 3, further comprising:
a support column drop preventing mechanism equipped with: movable pulleys supported in a manner vertically slightly movable and lockable together with rotating shafts;
a locking claw that turns in conjunction with vertical movement of said movable pulleys; and
engaging portions provided on a peripheral wall of said upper support column, said engaging portions allowing said locking claw to engage therewith.

17. The projector according to claim 3, wherein said lighting system is equipped with a balloon, an electric bulb, a holding frame for holding said electric bulb and a balloon inflating means for inflating said balloon, while a foldable storage bag for storing a contracted balloon and a openable and closeable storage body for storing said storage bag are mounted on a periphery of said balloon.

18. The projector according to claim 17, wherein said storage bag and said storage body are mounted on a central portion of an upper surface of said balloon.

19. The projector according to claim 17, wherein said holding frame comprises an upper plate fixed to the central portion of the upper surface of said balloon, a lower plate fixed to a central portion of a lower surface of said balloon, and a plurality of telescopic support columns erected between said upper plate and said lower plate.

20. The projector according to claim 17, wherein said balloon comprises an upper portion, an intermediate portion and a lower portion so that said upper portion, said lower portion and said intermediate portion are detachably joined to one another by an engaging means that is engageable and disengageable.

21. The projector according to claim 17, wherein a color filter colored with an arbitrary color is detachably mounted on a periphery of said holding frame.

22. The projector according to claim 3, further comprising an angle adjustment unit mounted on an upper end of said support column, said angle adjustment unit comprising a first spindle for supporting said lighting system in a manner capable of rotating back and forth; and a biasing member for biasing a rotating motion of said lighting system.

23. The projector according to claim 22, wherein said angle adjustment unit is equipped with a second spindle for supporting said angle adjustment unit in a manner capable of rotating in a horizontal direction.

* * * * *